(12) United States Patent
Cheng et al.

(10) Patent No.: US 11,677,072 B2
(45) Date of Patent: *Jun. 13, 2023

(54) DOPED LITHIUM ANODE, BATTERY HAVING A DOPED LITHIUM ANODE, AND METHODS OF USE THEREOF

(71) Applicant: Board of Trustees of Northern Illinois University, Dekalb, IL (US)

(72) Inventors: Yingwen Cheng, Sycamore, IL (US); Tao Xu, Lisle, IL (US); Ke Lu, DeKalb, IL (US); Haiping Xu, Downers Grove, IL (US)

(73) Assignee: Board of Trustees of Northern Illinois University, DeKalb, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,550

(22) Filed: Nov. 23, 2021

(65) Prior Publication Data

US 2022/0158180 A1 May 19, 2022

Related U.S. Application Data

(63) Continuation of application No. 16/386,162, filed on Apr. 16, 2019, now Pat. No. 11,217,788.

(51) Int. Cl.
| | | |
|---|---|---|
| *H01M 4/38* | (2006.01) | |
| *H01M 10/052* | (2010.01) | |
| *H01M 10/0568* | (2010.01) | |
| *H01M 10/0569* | (2010.01) | |
| *H01M 4/02* | (2006.01) | |

(52) U.S. Cl.
CPC ......... *H01M 4/382* (2013.01); *H01M 10/052* (2013.01); *H01M 10/0568* (2013.01); *H01M 10/0569* (2013.01); *H01M 2004/027* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 4,330,601 A | 5/1982 | Dey | |
| 11,217,788 B2 | 1/2022 | Cheng et al. | |
| 2008/0318128 A1* | 12/2008 | Simoneau | H01M 4/1395 429/231.95 |
| 2019/0088986 A1 | 3/2019 | Hu | |
| 2022/0158180 A1 | 5/2022 | Cheng | |

FOREIGN PATENT DOCUMENTS

| | | | |
|---|---|---|---|
| CN | 110265654 | * | 9/2019 |
| CN | 202080040727.6 | | 5/2021 |
| EP | 0 347 952 | | 12/1989 |

(Continued)

OTHER PUBLICATIONS

CN110265654 English translation. Xu et al. China. Sep. 20, 2019. (Year: 2019).*

(Continued)

*Primary Examiner* — Christopher P Domone
(74) *Attorney, Agent, or Firm* — Evan Law Group LLC

(57) ABSTRACT

An anode of a battery comprises lithium metal, and a dopant, in the lithium metal. The anode has a thickness of at most 50 μm, and the dopant is a metal with an electronegativity greater than lithium.

20 Claims, 21 Drawing Sheets

(56) References Cited

FOREIGN PATENT DOCUMENTS

| EP | 20722974.1 | 10/2022 |
|---|---|---|
| JP | H0726343 | 1/1995 |
| JP | 2015-022903 | 2/2015 |
| WO | 2014/194709 | 12/2014 |
| WO | 2020/214691 | 10/2020 |
| WO | 2022/098666 | 5/2022 |

OTHER PUBLICATIONS

Guidotti, R.A. et al., "Thermally activated ("thermal") battery technology Part IV. Anode materials", Journal of Power Sources, vol. 183, pp. 388-398, (2008).
Sangster, J. et al., "The Li—Sn (lithium-tin) system", Journal of Phase Equilibria, vol. 19, No. 1, pp. 70-75, (1998).
Alexander, W.A. et al., "The lithium-indium system", Canadian Journal of Chemistry, vol. 54, pp. 1052-1060, (1976).
Okamoto, H. Cu—Li (Copper-Lithium), Journal of Phase Equilibria and Diffusion, vol. 32, No. 2, p. 172, (2011).
Okamoto, H. "Li—Zn (Lithium-Zinc)", Journal of Phase Equilibria and Diffusion, vol. 33, No. 4, p. 345, (2012).
American Society for Metals, "Li—Ni Phase Diagram", Binary Alloy Phase Diagrams, vol. 2, p. 1494, (1986).
14 Pages, May 18, 2021, U.S. Appl. No. 16/386,162, US.
61 Pages, Jul. 23, 2021, U.S. Appl. No. 16/386,162, US.
10 Pages, Aug. 19, 2021, U.S. Appl. No. 16/386,162, US.
3 Pages, Nov. 1, 2021, U.S. Appl. No. 16/386,162, US.
Whittingham, M.S., "Ultimate limits to intercalation reactions for lithium batteries", Chemical Reviews, vol. 114, pp. 11414-11443, (2014).
Yang, Z. et al., "Electrochemical energy storage for green grid", Chemical Reviews, vol. 111, pp. 3577-3613, (2011).
Scrosati, B. et al., "Lithium-ion batteries. A look into the future", Energy & Environmental Science, vol. 4, pp. 3287-3295, (2011).
Lu, K. et al., "Manipulating polysulfide conversion with strongly coupled $Fe_3O_4$ and nitrogen doped carbon for stable and high capacity lithium-sulfur batteries", Advanced Functional Materials, vol. 29, pp. 1807309-1-1807309-8, (2019).
Albertus, P., "Status and challenges in enabling the lithium metal electrode for high-energy and low-cost rechargeable batteries", Nature Energy, vol. 3, pp. 16-21, (2018).
Lin, D. et al., "Reviving the lithium metal anode for high-energy batteries", Nature Nanotechnology, vol. 12, pp. 194-206, (2017).
Xu, W. et al., "Lithium metal anodes for rechargeable batteries", Energy & Environmental Science, vol. 7, pp. 513-537, (2014).
Cheng, X-B. et al., "Toward safe lithium metal anode in rechargeable batteries: A review", Chemical Reviews, vol. 117, pp. 10403-10473, (2017).
Qian, J. et al., "High rate and stable cycling of lithium metal anode", Nature Communications, vol. 6, pp. 1-9, found at www.nature.com/articles/ncomms7362#supplementary-information, (2015).
Zheng, J. et al., "Electrolyte additive enabled fast charging and stable cycling lithium metal batteries", Nature Energy, vol. 2, pp. 1-8, found at www.nature.com/articles/nenergy201712#supplementary-information, (2017).
Tikekar, M.D. et al., "Design principles for electrolytes and interfaces for stable lithium-metal batteries", Nature Energy, vol. 1, pp. 1-7, article No. 16114, (2016).
Aurbach, D. et al., "A short review of failure mechanisms of lithium metal and lithiated graphite anodes in liquid electrolyte solutions", Solid State Ionics, vol. 148, pp. 405-416, (2002).
Bieker, G. et al., "Electrochemical in situ investigations of SEI and dendrite formation on the lithium metal anode", Physical Chemistry Chemical Physics, vol. 17, pp. 8670-8679, (2015).
Lu, D. et al. "Failure mechanism for fast-charged lithium metal batteries with liquid electrolytes", Advanced Energy Materials, vol. 5, pp. 1-7, (2015).
Aurbach, D. et al., "Factors which limit the cycle life of rechargeable lithium (metal) batteries", vol. 147, No. 4, pp. 1274-1279, (2000).
Li, G. et al., "Stable metal battery anodes enabled by polyethylenimine sponge hosts by way of electrokinetic effects", Nature Energy, vol. 3, pp. 1076-1083, (2018).
Wei, S. et al., "Electrochemical interphases for high-energy storage using reactive metal anodes", Accounts of Chemical Research, vol. 51, pp. 80-88, (2018).
Xin, S. et al., "Solid-state lithium metal batteries promoted by nanotechnology: Progress and prospects", ACS Energy Letters, vol. 2, pp. 1385-1394, (2017).
Li, N.W. et al., "An artificial solid electrolyte interphase layer for stable lithium metal anodes", Advanced Materials, vol. 28, pp. 1853-1858, (2016).
Liang, J. et al., "In situ $Li_3PS_4$ solid-state electrolyte protection layers for superior long-life and high-rate lithium-metal anodes", Advanced Materials, vol. 30, pp. 1804684-1-1804684-9, (2018).
Kim, M.S. et al., "Langmuir-Blodgett artificial solid-electrolyte interphases for practical lithium metal batteries", Nature Energy, vol. 3, pp. 889-898, (2018).
Jiao, S. et al., "Stable cycling of high-voltage lithium metal batteries in ether electrolytes", Nature Energy, pp. 739-746, (2018).
Slotboom, J.W. et al., "Measurements of bandgap narrowing in Si bipolar transistors", Solid-State Electronics, vol. 19, pp. 857-862, (1976).
Jensen, T. et al., "Investigation of diode-pumped 2.8-μm $Er:LiYF_4$ lasers with various doping levels", Optics Letters, vol. 21, No. 8, pp. 585-587, (1996).
Bang, H.J. et al., "Electrochemical investigations of lithium-aluminum alloy anode in Li/polymer cells", Journal of Power Sources, vol. 92, pp. 45-49, (2001).
Stark, J.K. et al., "Dendrite-free electrodeposition and reoxidation of lithium-sodium alloy for metal-anode battery", Journal of the Electrochemical Society, vol. 158, No. 10, pp. A1100-A1105, (2011).
Xu, T. et al., "Synthesis of supported platinum nanoparticles from Li—Pt solid solution", Journal of the American Chemical Society, vol. 132, pp. 2151-2153, (2010).
Barkholtz, H.M. et al., "Lithium assisted "Dissolution-Alloying" synthesis of nanoalloys from individual bulk metals", Chemistry of Materials, vol. 28, pp. 2267-2277, (2016).
Pelton, A.D. "The Ag—Li (Silver-Lithium) system", Bulletin of Alloy Phase Diagrams, vol. 7, No. 3, pp. 223-228, (1986).
Kozen, A.C. et al., "Next-generation lithium metal anode engineering via atomic layer deposition", ACS Nano, vol. 9, No. 6, pp. 5884-5892, (2015).
Li, G. et al., "Self-formed hybrid interphase layer on lithium metal for high-performance lithium-sulfur batteries", ACS Nano, vol. 12, pp. 1500-1507, (2018).
Bensalah, N. et al., "Review on synthesis, characterizations, and electrochemical properties of cathode materials for lithium ion batteries", Journal of Material Science & Engineering, vol. 5, issue 4, pp. 1000258-1-1000258-21, (2016).
Arora, P. et al., "Battery separators", Chemical Reviews, vol. 104, No. 10, pp. 4419-4462, (2004).
Schroder, R. et al., "Comparatively assessing different shapes of lithium-ion battery cells", ScienceDirect Procedia Manufacturing, vol. 8, pp. 104-111, (2017).
Cao, C. et al., "Recent advances in inorganic solid electrolytes for lithium batteries", Frontiers in Energy Research, vol. 2, article 25, pp. 1-9, (2014).
Barkholtz. J.M. "Synthesis and characterization of nanoalloys and non-precious metal catalysts for energy and environmental applications", Northern Illinois University, Huskie Commons Institutional Repository, pp. 1-248, (2016).
Lu, K. et al., "Modulating reactivity and stability of metallic lithium via atomic doping", Journal of Materials Chemistry A, vol. 8, pp. 10363-10369, (2020).
International Search Report and Written Opinion dated Jun. 17, 2020 for PCT application No. PCT/US2020/028297.
12 Pages, Dec. 1, 2022, U.S. Appl. No. 17/533,550, US.

(56) References Cited

OTHER PUBLICATIONS

International Search Report and Written Opinion dated Feb. 28, 2022 for PCT application No. PCT/US2020/057765.

* cited by examiner

| doping level | (110) (200) ratio |
|---|---|
| Li-Al 1000:1 | 1 : 3.12 |
| Li-Ag 5000:1 | 1 : 1.96 |
| Li-Ag 1000:1 | 1 : 4.76 |
| Li-Ag 100:1 | 1 : 1.33 |
| Undoped Li | 1 : 0.185 |

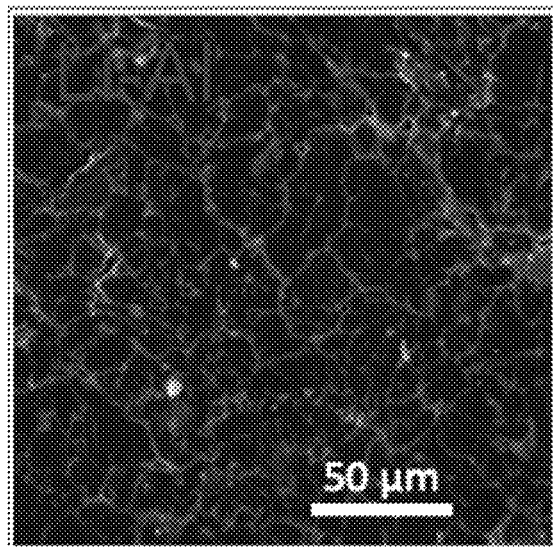
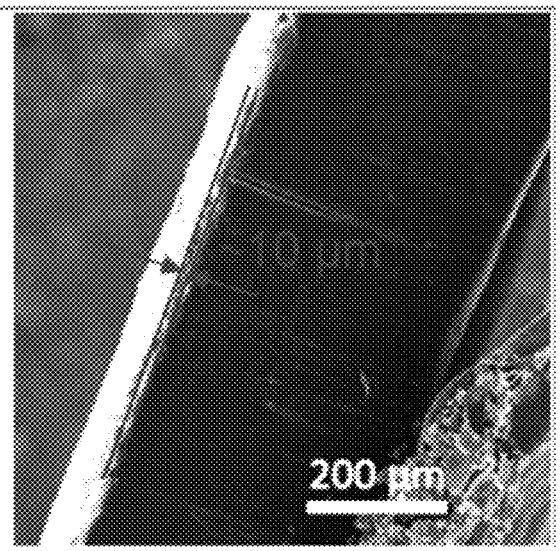
FIG. 21A  FIG. 21B
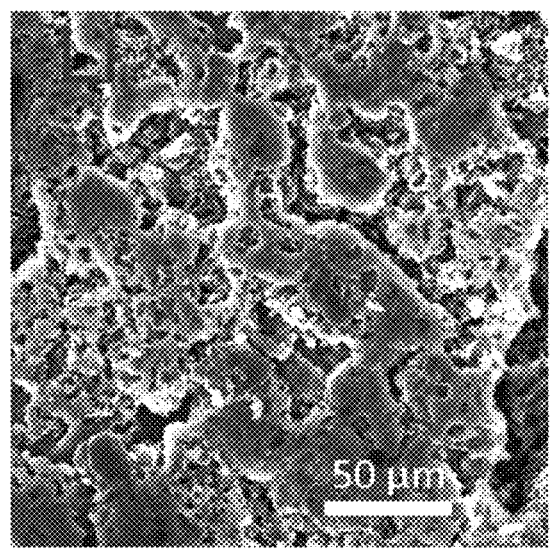
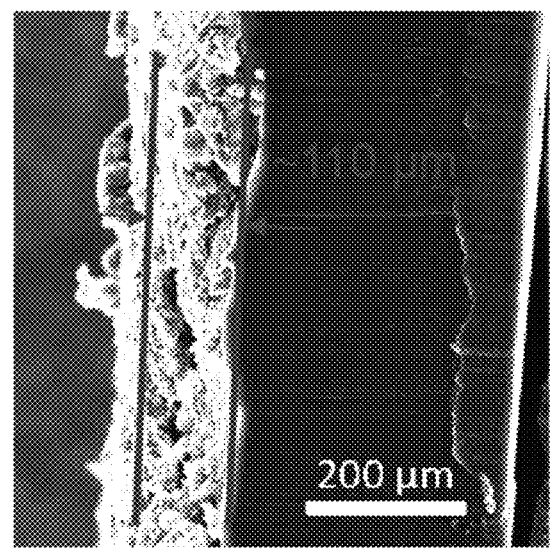
FIG. 21C  FIG. 21D

DOPED LITHIUM ANODE, BATTERY HAVING A DOPED LITHIUM ANODE, AND METHODS OF USE THEREOF

BACKGROUND

Lithium ion batteries designed with intercalation cathodes and anodes can efficiently convert and store electricity as chemical energy, and are being increasingly used in a large number of applications, such as electronics, robotics and electric vehicles. However, these batteries have limited energy density and high costs, and are not suitable for future energy storage especially for large-scale applications. Hence, there is an urgent need for higher energy alternatives. One attractive path is designing advanced metal batteries in which a high capacity cathode such as sulfur, oxygen or Ni-rich layered oxides is combined with a metallic lithium anode. This is promising because lithium metal has a ten times higher specific energy compared with graphite (3860 vs. 370 mAh $g^{-1}$) and a lower electrochemical potential. To achieve success with such a lithium anode, it is necessary to provide truly reversible lithium electrodes with stable electrode-electrolyte interface, which would allow for highly efficient cycling of ultra-thin lithium foils (≤30 μm) without electrolyte consumption for hundreds of cycles.

Lithium metal has an extremely high chemical reactivity, which poses critical challenges to its use in commercial batteries. It is naturally unstable in almost all electrolytes and spontaneously forms fragile, nonuniform and insulating solid-electrolyte interfaces (SEI). These result in uneven Li-ion flux which accelerates the growth of dendrites along with lithium metal corrosion and electrolyte decomposition. The stabilization of lithium metal has been under intensive study, and to date, most of the efforts have focused on the development of three-dimensional structural hosts that effectively reduce local current densities, surface protective or interfacial layers, and novel electrolytes or additives to promote stronger SEI. The application of physical layers including solid-state electrolytes and polymer electrolytes are also used to prevent detrimental side-reactions. Although these approaches assist in lithium metal electrodes with better stability, it is still very challenging to obtain stabilized cycling under high current densities and high cycling capacities. In addition, these methods rarely attempt to modulate the fundamental properties of metallic lithium, and therefore the performance improvements are still limited by its intrinsic reactivity.

SUMMARY

In a first aspect, the present invention is an anode comprising lithium metal and a dopant. The anode has a thickness of at most 50 μm and the dopant is a metal with an electronegativity greater than lithium. Preferably the dopant comprises silver or aluminum.

In a second aspect, the present invention is a battery, comprising an anode, an anode charge collecting element, a cathode, a cathode charge collecting element, an electrolyte, and a housing. The anode comprises lithium doped with a dopant.

In a third aspect, the present invention is a method of making a doped lithium anode comprising: melting lithium metal, introducing a dopant metal into the lithium metal to form molten doped lithium metal, solidifying the doped lithium metal, and forming the doped lithium metal into a foil having a thickness of at most 450 μm.

In a fourth aspect, the present invention is a method of generating electricity from the above battery, comprising: connecting the anode and cathode of the battery to an external load to complete a circuit.

In a fifth aspect, the present invention is a method of recharging the above battery, comprising: connecting the battery to an electrical power source.

Definitions

A "cell" is basic electrochemical unit that contains the electrodes, separator, and electrolyte.

A "battery" is defined as a collection of cells or cell assemblies, with housing, electrical connections, and optionally additional elements for protection or control.

A "dopant" refers to any metal additive that does not form intermetallic compounds with the primary metal in the amount used.

"Anode" refers to the electrode where oxidation takes place during the discharge cycle. The anode may be one continuous body, or it may include more than one thin film attached to a current collecting element.

"Cathode" refers to the electrode where reduction takes place during the discharge cycle. The cathode may be one continuous body, or it may include more than one thin film attached to a current collecting element.

"Separator" refers to a barrier between the cathode and the anode to prevent them from coming into contact. If the electrolyte is solid, a separator is not necessary to avoid contact between the anode and cathode.

"Electrolyte" refers to a solution containing a solvent and ions, which conducts ions but is an insulator to electrons. An electrolyte may be a liquid, solid, or gel.

"Cycle" refers to the process of charging a rechargeable battery and discharging it as required into a load. The term is typically used to specify a battery's expected life, as the number of charge cycles affects life more than the mere passage of time.

The "rate of discharge" refers to the rate at which a battery would theoretically fully charge or discharge the battery in one hour. The rate of discharge is abbreviated as the "C rate" or "C". For example, trickle charging might be performed at C/20 (or a "20 hour" rate), while typical charging and discharging may occur at C/2 (two hours for full capacity).

All percentages refer to atomic percentage, unless otherwise specified. Where the dopant percentage is not specified, the atomic percent of dopant is 0.1 percent.

BRIEF DESCRIPTION OF THE DRAWINGS

FIG. 5A illustrates a comparison of surface tarnish for lithium and lithium doped with 0.1 mol % Ag.

FIG. 5B illustrates a Nyquist plot of doped lithium metal in dry air after different days of exposure.

FIG. 5C illustrates pristine lithium after 5 days of exposure.

FIG. 5D illustrates doped lithium after 20 days of exposure.

FIG. 21A illustrates an aluminum doped lithium anode.

FIG. 21B illustrates an aluminum doped lithium anode solid electrolyte interface (SEI).

FIG. 21C illustrates a pristine lithium anode.

FIG. 21D illustrates a pristine lithium anode SEI.

DETAILED DESCRIPTION

The addition of dopants as trace impurities is a powerful approach for altering the electrical or optical properties of a substrate, and has been widely demonstrated in fields such as solid-state electronics and lasers. The present invention describes anodes of lithium metal doped with trace amounts of a dopant, such as silver or aluminum. The doped metal exhibits enhanced chemical stability and much better electrochemical reactivity. The introduction of dopants significantly increased its stability as the doped anode remained shiny with no degradation in electrochemical activity after exposure to dry air for months. The doped lithium metals as the anode exhibited more stable cycling compared to pristine lithium, with less change in battery capacity as the number of battery cycles increases. The doped lithium metals exhibited very fast electrochemical kinetics, with at least ten times higher exchange current densities at room temperature and become even faster at elevated temperatures. The doped metals also had substantially improved stability and enabled high-capacity and dendrite free battery cycling in both carbonate and ether electrolytes, demonstrating that these doped metals would be suitable for use in a variety of battery systems. The doped lithium anode also demonstrated success when paired with a sulfur cathode or a nickel-manganese-cobalt oxide (NMC811) cathode.

Figure 1A:
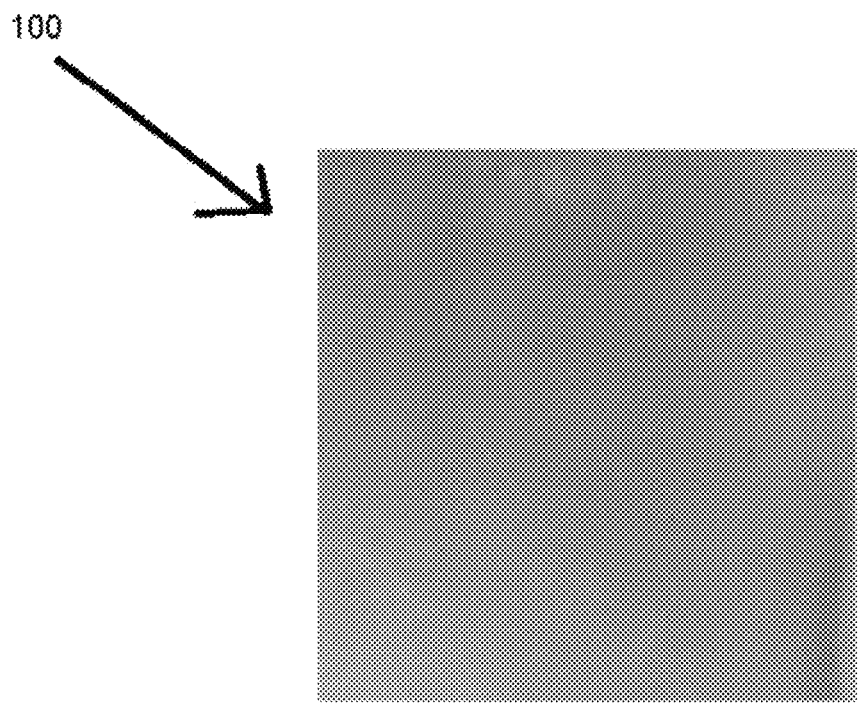
FIG. 1A shows a thin film doped lithium metal anode.
Figure 1B:
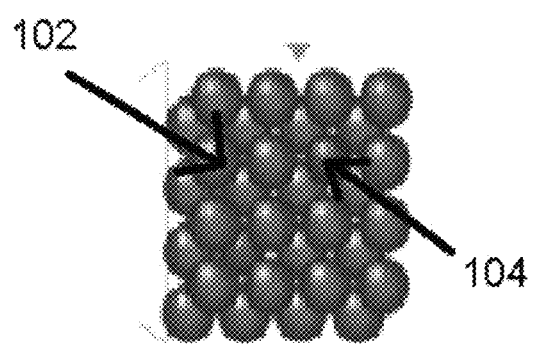
FIG. 1B illustrates a diagram of doped lithium metal.

FIG. 1A illustrates a thin film anode, 100 comprising lithium metal and a dopant. FIG. 1B illustrates a diagram of the crystal structure of lithium, 102, doped with a dopant, 104.

The dopant may be any metal that has an electronegativity greater than the electronegativity of lithium. The dopant may be beryllium, magnesium, aluminum, calcium, scandium, titanium, vanadium, chromium, manganese, iron, nickel, cobalt, copper, zinc, gallium, germanium, yttrium, zirconium, niobium, molybdenum, ruthenium, rhodium, palladium, silver, cadmium, indium, tin, antimony, lanthanum, cerium, praseodymium, neodymium, samarium, europium, gadolinium, terbium, dysprosium, holmium, erbium, thulium, ytterbium, lutetium, hafnium, tantalum, tungsten, rhenium, osmium, iridium, platinum, gold, mercury, lead, bismuth, actinium, protactinium, thorium, neptunium, uranium, americium, plutonium, and curium. Preferably the dopant is aluminum, silver, platinum, tin or gold. Most preferably the dopant is aluminum or silver.

The anode of the present invention includes lithium metal doped with a dopant. The dopant may be present in an amount of 0.01-2.0 atomic percent, including 0.02, 0.03, 0.04, 0.05, 0.06, 0.07, 0.08, 0.09, 0.1, 0.3, 0.4, 0.5, 0.6, 0.7, 0.8, 0.9, 1.0, 1.1, 1.2, 1.3, 1.4, 1.5, 1.6, 1.7, 1.8, and 1.9. Preferably the dopant is present in an amount of 0.5-0.05 atomic percent. Preferably, the dopant does not form intermetallic phases, and is present interstitially or replaces a lithium atom in the lithium crystal structure.

The doped lithium may be pressed into foils with a thickness of 1 to 450 µm. Preferably the foil has a thickness of less than 50 µm, including 5, 10, 15, 20, 25, 30, 35, 40 and 45 µm. Most preferably, the foil has a thickness of at most 30 µm.

The anode demonstrates stability in dry air. To demonstrate stability in dry air, an anode must show less than 5% surface tarnish after 20 days of exposure to dry air (relative humidity<5%).

The doped anode also demonstrates improved charge transport at the anode/electrolyte interface, compared to an anode of pristine lithium. The diffusion coefficient of the doped anode may be 2, 3, 4, 5, 6, 7, 8, 9, 10, 15, 20, 25, 30, 35, 40, 45, 50, 55, 60, 65, 70, 75, or 80 times greater than the diffusion coefficient of a pristine lithium anode. The doped anode shows an increasing diffusion coefficient, compared to pristine lithium, as the temperature increases, as shown in FIG. 6. The temperature of the anode may be 0, 10, 15, 20, 25, 30, 35, 40, 45, 50, 55, 60, 65, 70, 75, 80, 85, 90, 95, or 100° C. Preferably the doped anode demonstrates a diffusion coefficient that is at least ten times greater than the diffusion coefficient of pristine lithium. The doped anode preferably passes the improved charge transport test, which requires the doped anode to have a diffusion coefficient that is at least ten times greater than the diffusion coefficient of a pristine lithium anode, when the diffusion coefficients of the two anodes are tested with 1.0M $LiPF_6$ in ethylene carbonate/diethylcarbonate (EC/DMC) as the electrolyte.

Optionally, the anode may be incorporated into a battery, having a cathode, electrolytes and a housing. The battery may also include charge collecting elements on the anode and cathode to gather or distribute the electrons. The charge collecting elements may be connected to an external circuit that is optionally connected to a load or to a recharging source.

Figure 2:
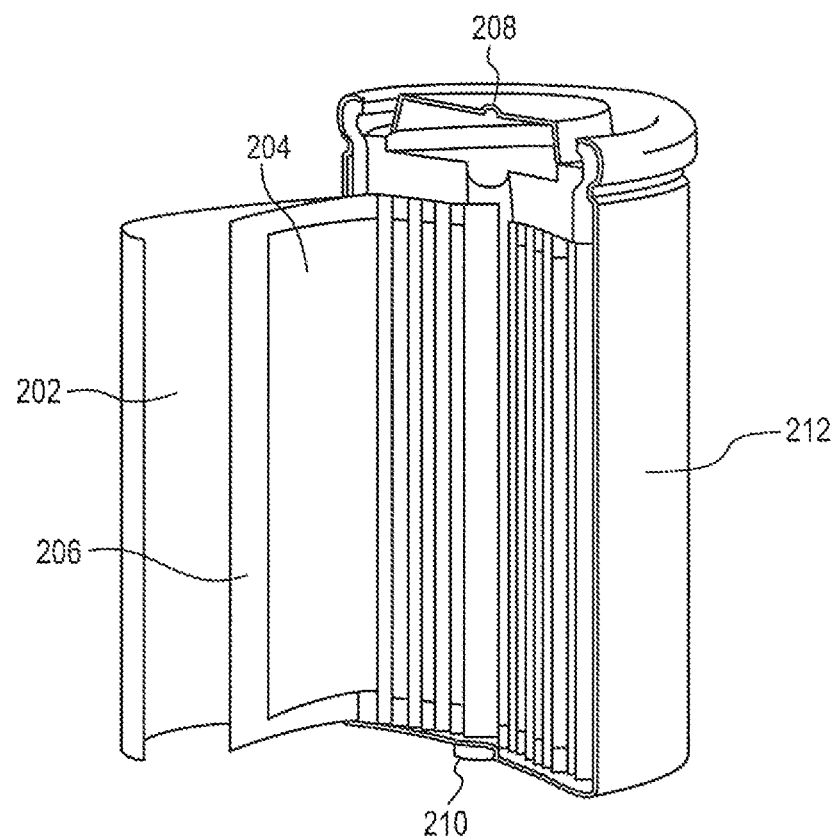
FIG. 2 shows a battery having a cathode, anode, and separator.

FIG. 2 illustrates a battery, 200. The battery has an anode, 202 and a cathode, 204. The anode and cathode are rolled up, and a separator, 206, is between the cathode and anode. The battery has a positive terminal, 208 and a negative terminal 210. The battery is enclosed in a housing, 212.

Figure 3:
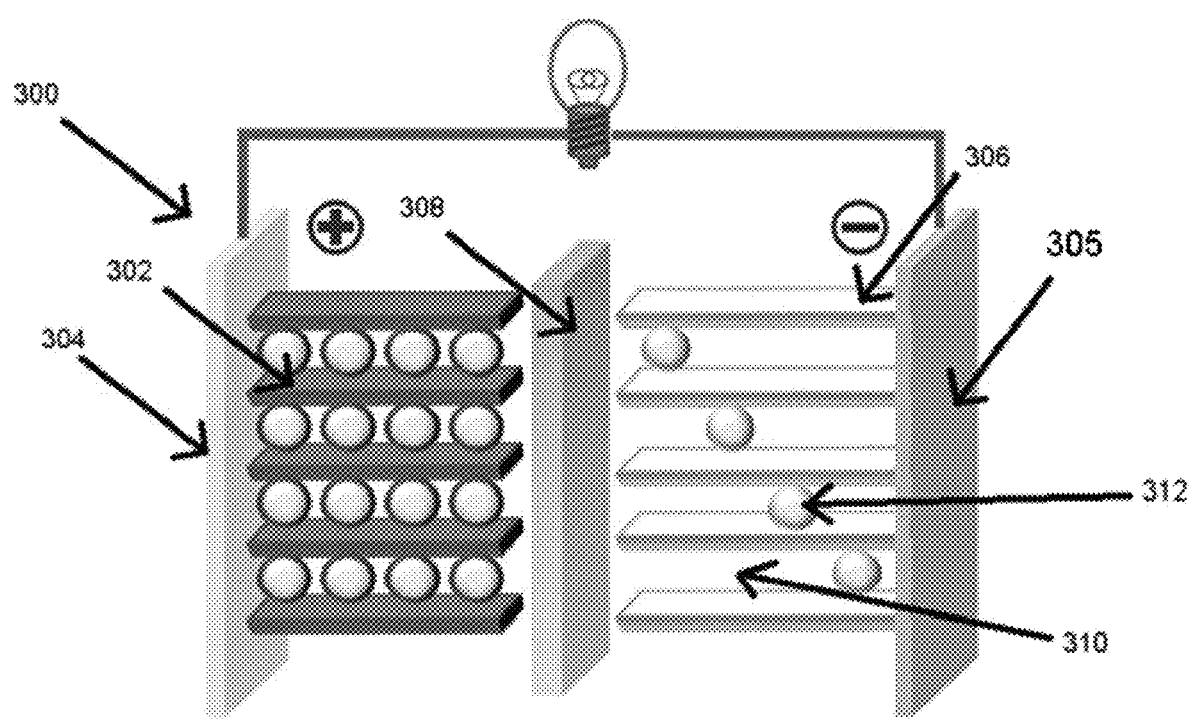
FIG. 3 illustrates a schematic of a lithium ion battery.

FIG. 3 illustrates a schematic of a battery, 300. The battery has a cathode, 302, illustrated as thin film strips, attached to a cathode charge collecting element, 304. The anode, 306 is attached to an anode charge collecting element, 305. A separator, 308 is positioned between the anode and cathode. The electrolyte, 310 is in contact with the anode and cathode, and allow for the movement of ions, 312 between the anode and cathode.

In a lithium-ion battery, the lithium ions move from the anode to the cathode during discharge and in the opposite direction during recharge. The electrolyte carries positively charged lithium ions from the anode to the cathode and vice versa through the separator. The movement of the lithium ions creates free electrons in the anode which creates a charge at the anode current collecting element. The electrical current then flows from the current collector on the cathode, through a load (device being powered), to the current collecting element on the anode. When the battery is being recharged the electrons and ions flow in the opposite directions.

Preferably the battery maintains a capacity of at least 50% of the battery's initial capacity after 200 cycles. The battery may retain a capacity of 55%, 60%, 65%, 70%, 75%, 80%, 85%, 90%, 95% and 100% of the battery's initial capacity after 200 cycles. Most preferably the battery maintains a capacity of at least 70% of the initial capacity. Preferably the battery maintains a capacity of at least 50% of the battery's initial capacity for 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780 or 800 cycles.

The cathode of the battery preferably comprises sulfides, cobalt compounds, graphite, nickel compounds, manganese compounds, oxides, and iron compounds, in combination or alone. $LiCoO_2$ and $LiMn_2O_4$ are two of the most common cathode materials used in lithium ion batteries. The cobalt material has a high theoretical specific heat capacity, high volumetric capacity, low self-discharge, high discharge voltage, and good cycling performance. The manganese cathodes are attractive because manganese is cheaper than cobalt. The cathode may also be made of nickel manganese cobalt (NMC), nickel cobalt aluminum (NCA), or lithium iron phosphorus (LiFePO or LFP). One skilled in the art would appreciate that the ratios of the cathode component elements may be optimized to improve the desired characteristics. An example of a high capacity cathode is NMC811, which means a cathode made of 80% nickel, 10% manganese, and 10% cobalt. The cathodes and cathode materials described in Bensalah N, Dawood H (2016) Review on Synthesis, Characterizations, and Electrochemical Properties of Cathode Materials for Lithium Ion Batteries. J Material Sci Eng 5: 258 are hereby incorporated by reference.

Another cathode material of interest is sulfur. Lithium-sulfur batteries have advantages over lithium-ion cells because of their higher energy density and reduced cost from the use of sulfur. Sulfur has low conductivity, so the sulfur cathodes may also be paired with a highly conductive material to improve the conductivity. A carbon coating may be used to provide the missing electroconductivity. Sulfur based electrodes include copolymerized sulfur, sulfur-graphene oxide, and sulfur/lithium-sulfide. Preferably the sulfur cathode comprises a dimethylformamide (DMF) slurry containing Ketjen-Black carbon/sulfur composite (80 wt % of sulfur), carbon black (SUPER-P®) and polyvinylidene fluoride (PVDF) in a mass ratio of 8:1:1. Preferably the cathode is formed on aluminum foils as the cathode current collector.

Separators are preferred components in liquid electrolyte batteries. In the case of a liquid electrolyte, the separator is a foam material that is soaked with the electrolyte and holds it in place. The separator needs to be an electronic insulator while having minimal electrolyte resistance, maximum mechanical stability, and chemical resistance to degradation in the highly electrochemically active environment. In addition, the separator often has a safety feature, called "thermal shutdown;" at elevated temperatures, it melts or closes its pores to shut down the lithium-ion transport without losing its mechanical stability. Separators are either synthesized in sheets and assembled with the electrodes or deposited onto one electrode in situ. A separator generally includes a polymeric membrane forming a microporous layer. The separator may be made from nonwoven fibers, such as cotton, nylon, polyesters, glass; polymer films, such as polyethylene, polypropylene, poly (tetrafluoroethylene), polyvinyl chloride; ceramic; and naturally occurring substances, such as rubber, asbestos, or wood. The separator materials described in Arora, P. et al., Battery Separators *Chemical Reviews* 2004 104 (10), pg. 4419-4462 are hereby incorporated by reference.

The electrolyte provides a medium for the transport of the lithium ions from the cathode to the anode and vice versa. Types of electrolytes include liquid, polymer, and solid-state electrolytes. Liquid electrolytes in lithium-ion batteries include salts, such as $LiPF_6$, $LiBF_4$, and $LiClO_4$, and a solvent, such as ethylene carbonate, dimethyl carbonate, and diethyl carbonate. The selection of the electrolyte may be influenced by the selection of the cathode material. One skilled in the art would select an appropriate electrolyte, an appropriate electrolyte volume, and an appropriate electrolyte concentration based on the cathode material, separator material, anode material, and cell design. The concentration of the electrolyte may be 0.1 M to 10.0 M, including 0.2, 0.3, 0.4, 0.5, 0.6, 0.7, 0.8, 0.9, 1.0, 2.0, 3.0, 4.0, 5.0, 6.0, 7.0, 8.0, and 9.0 M. Preferably the concentration of the electrolyte is 0.5-2.0 M. Preferably the electrolyte is $LiPF_6$ in ethylene carbonate/dimethyl carbonate (EC/DMC) or $LiPF_6$ in ethylene carbonate/diethyl carbonate (EC/DME). The ratio of the ethylene carbonate to dimethyl carbonate or diethyl carbonate is preferably 1:1 by volume. Another preferred electrolyte in batteries having a sulfur cathode is lithium bis (trifluoromethane)sulfonimide (LiTFSI) in dioxolane/dimethoxyethane (DOUDME); around 2% $LiNO_3$ may be added to improve coulombic efficiency.

The electrolyte may be a solid, such as a ceramic. Solid electrolytes avoid the risk of leaks, and a separator is not necessary as the solid electrolyte prevents contact between the anode and the cathode. Solid ceramic electrolytes are mostly lithium metal oxides. Ceramic solid electrolytes are highly ordered compounds with crystal structures that usually have ion transport channels. Common ceramic electrolytes are lithium super ion conductors (LISICON) and perovskites. The solid electrolytes described in Cao et al., Recent advances in inorganic solid electrolytes for lithium batteries, Front. Energy Res., 27 Jun. 2014 are hereby incorporated by reference.

The current collecting element collects the electrons from the anode during discharge, prior to the electrons entering the external circuit. The current collecting element on the cathode will distribute the electrons to the cathode material. During recharging the electrons move in the opposite direction. The current collecting elements may comprise aluminum, copper, steel, or other conductive materials.

The housing encloses the battery and prevents the electrolyte for leaking. The housing may comprise metal or plastics. The housing may be rigid or flexible. Flexible housing materials allows for expansion of the cell during recharging, or for expansion caused by gas formation inside the battery. The battery structures and manufacturing techniques described in Schroder et al., Comparatively assessing different shapes of lithium-ion battery cells, *ScienceDirect Procedia Manufacturing* 8 pg. 104-111 (2017) are hereby incorporated by reference.

The battery shape and design may be selected from various shapes to optimize the battery and avoid overheating, increase energy density, or reduce self-discharge. Common battery designs include small cylindrical (solid body without terminals, such as those used in older laptop batteries), button cells, prismatic cells, large cylindrical (solid body with large threaded terminals), pouch (soft, flat body, such as those used in cell phones and newer laptops; also referred to as Li-ion polymer or lithium polymer batteries), and rigid plastic case with large threaded terminals (such as in electric vehicles).

EXAMPLES

Synthesis of Doped Lithium Metal Anode

The doping of lithium metal was performed inside an argon-filled glovebox, and as a general procedure, 2.0 g of lithium was slowly melted at 220° C. in a nickel crucible. Then the dopant metal (in the form of bulk wire) was immersed to the molten lithium where it dissolves in a few seconds. The mixture was kept at 220° C. for 2 hours to ensure complete homogenization. The doped molten lithium was then quenched to room temperature and a piece of doped lithium lump was obtained, which was pressed into foils with a thickness of 450 or 30 μm using a rolling press for battery assembly. These foils were cut into 16 mm discs for investigation of their properties and electrochemical behavior. To ensure proper comparison, the identical procedure was used to process the undoped lithium electrodes.

Figure 4A:
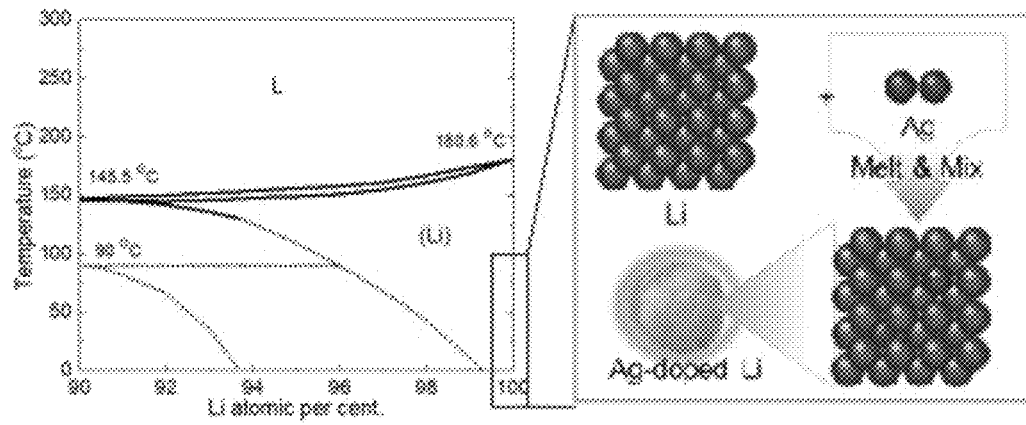
FIG. 4A illustrates Li—Ag binary phase diagram that shows the formation of homogeneous and uniformly dispersed Ag (at <1% molar ratios) in the lithium matrix upon cooling the molten mixture.

Lithium based binary phase diagrams were used to rationally select the dopant and the molar ratio (FIG. 4A), and focused on the use of silver as the dopant as it has a similar atomic radius as Li (1.65 Å for Ag vs 1.67 Å for Li) and they both commonly assume the +1 oxidation state. The molar ratio was varied from 0.02% to 1% to ensure complete solvation of silver atoms without forming alloy phases. In addition to silver, lithium metals doped with aluminum, tin, platinum, gold and palladium were also prepared and studied.

Electrochemical Measurements

Electrochemical studies were performed using 2025-coin cells. Cyclic voltammograms were recorded using a CH Instruments potentiostat. Battery cycling and rate behavior were evaluated using Neware CT-4008 battery analyzers. Electrochemical impedance measurements were conducted at room temperature using a Gamry Reference 600 potentiostat with a frequency range of 0.02 Hz to 100 kHz. The symmetric cells were assembled using lithium metal anodes of identical composition using either 1.0 M lithium bis (trifluoromethane)sulfonimide (LiTFSI) in dioxolane/dimethoxyethane (DOUDME; 1:1 vol) or 1.0M $LiPF_6$ in ethylene carbonate/diethyl carbonate (EC/DEC, 1:1 vol). The electrolyte volume was 70 μl. Two types of cathodes were used to evaluate prototype lithium metal batteries. The NCM-811 electrodes (~9.12 mg $cm^{-2}$) were supplied by the Cell Analysis, Modeling, and Prototyping Facility at Argonne National Laboratory. The electrodes were punched into 16 mm discs and dried at 75° C. under vacuum overnight before use. The batteries were cycled initially 0.1 C for 3 cycles at and then cycled at 1 C for 200 cycles, with a voltage window of 2.7 to 4.3 V. A combination of constant current and constant voltage charging protocol was used for the cycling at 1 C, and when the voltage reached 4.3V, the battery was held at 4.3 V until the charging current decreased to the value equivalent to 0.1 C (1 C=1.5 mA/cm$^2$). The sulfur electrodes (~2.5 mg/cm$^2$ loading) were prepared by casting a dimethylformamide (DMF) slurry containing Ketjen-Black carbon/sulfur composite (80 wt % of sulfur), SUPER-P® and PVDF in a mass ratio of 8:1:1 on aluminum foils. The sulfur electrodes were also dried under vacuum and cut to 12 mm discs. The batteries were cycled at room temperature between 1.0 and 3.0 V.

Physical and Transport Properties of the Doped Lithium Anodes

Figures 4B, 4C:
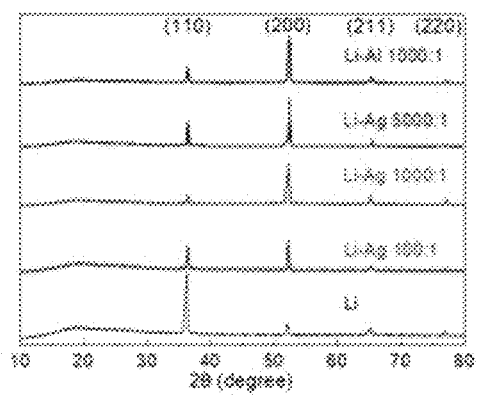
FIG. 4B illustrates an X-ray diffraction pattern (XRD) of pristine lithium and silver doped lithium with different molar ratios, the XRD of aluminum doped lithium was also included for comparison.
FIG. 4C illustrates a chart comparing the ratio of (100) peaks and (200) peaks, in relation to the doping level.

The X-ray diffraction (XRD) of doped lithium metals electrodes with silver and aluminum at different molar ratios all exhibited peaks that can be indexed to the body-centered cubic structure of lithium crystals (lm-3m) and no alloy phases were identified (FIG. 4B), which reveals the dopant is incorporated uniformly in the lithium crystal structure. XRD measurements were carried out on a Rigaku MiniFlex X-ray diffractometer operating at 30 kV and 15 mA, using Cu K$\alpha$ radiation ($\lambda$=0.15405 nm). SEM images were collected using a Tescan Vega II microscope and the EDX spectra were collected using a INCAx-act Analytical EDS detector (Oxford Instruments). The electrodes were washed inside a glovebox and vacuum dried prior to analysis. The XPS spectra were collected using a Kratos AXIS Ultra DLD spectrometer. The binding energies were calibrated using the C 1s peak at 284.5 eV.

These experiments study the changes to the physiochemical properties of lithium metal via heteroatom doping, without introducing alloy phases. One significant feature of these results is the dramatic changes in the relative intensity of the (110) and (200) peaks. Curve fitting of the changes in the X-ray diffraction suggest the dopants occupy vacant face-centered sites in the body centered cubic crystal structure of metallic lithium. Importantly, this effect is most pronounced for the electrodes with 0.1% Ag and the peak ratio was 1:4.76, as opposed to the 1:0.185 of pristine lithium electrodes. Similar results were obtained with aluminum doped electrodes.

Figure 5E:
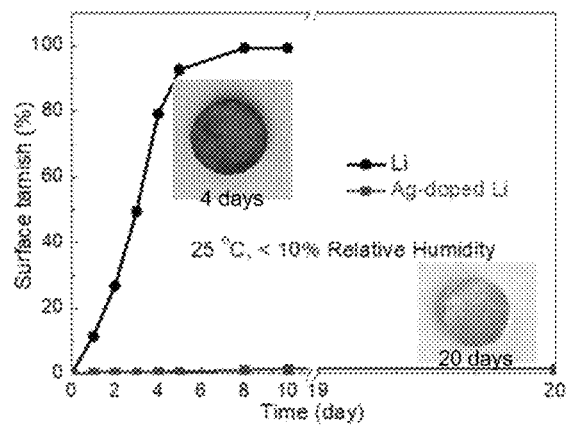
FIG. 5E illustrates a Nyquist plot of pristine lithium in dry air after different days of exposure.
Figure 5E:
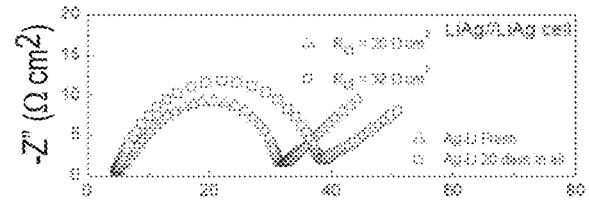
Figure 5E:
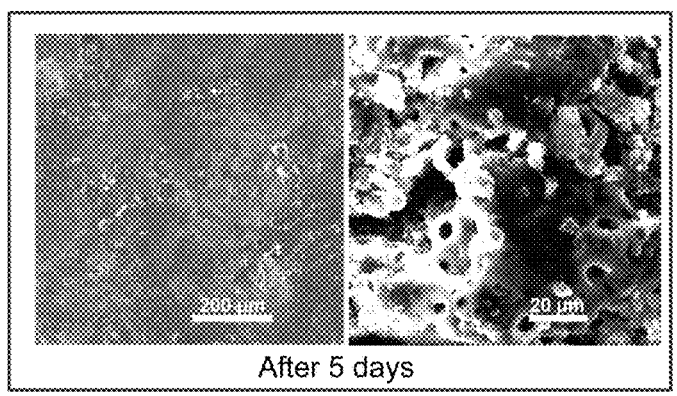
Figure 5E:
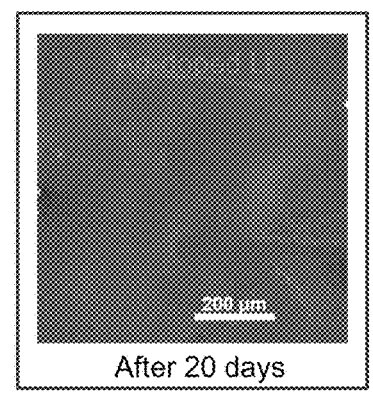
Figure 5E:
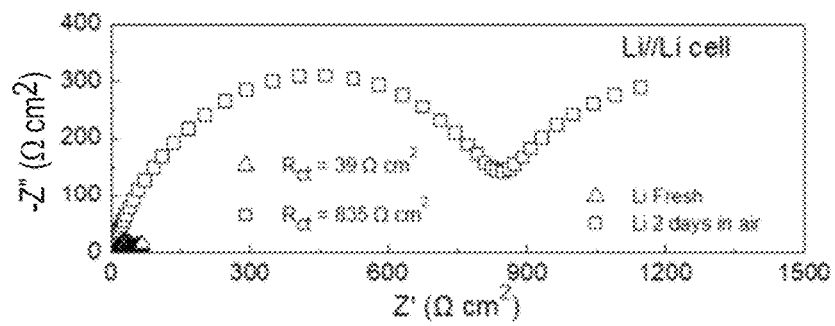

The silver doped lithium (at 0.1 atomic percent) electrodes have significantly improved stability in dry air (relative humidity<5%), which is in strong contrast to the case of pristine lithium electrodes where they react readily and form insulating nitride/oxide surface layers. The comparison of surface tarnishing percentage estimated from optical analysis reveals that the Ag doped lithium remained shiny without black tarnish for weeks whereas the pristine lithium metal is completely covered with black tarnish within a few days (FIG. 5A). The changes in Li+/Li transport properties of doped and pristine lithium electrodes after various days of exposure was compared via electrochemical impedance spectroscopy (EIS) using symmetric coin cells (FIG. 5B and FIG. 5E). The charge-transfer resistance ($R_{ct}$) of the silver doped lithium electrodes only increased slightly after 20 days of exposure (26 to 32 $\Omega$cm$^{-2}$), as opposed to the at least 20 times increase in pristine lithium electrodes within only two days. As expected, the SEM analysis confirms the surface of doped lithium remained dense without evident corrosion pits while pristine lithium become very porous (FIG. 5C-D). Importantly, the substantially enhanced dry-air stability as a result of silver doping would enable the integration of doped lithium electrodes in conventional manufacturing process without additional surface protection.

Figure 6A:
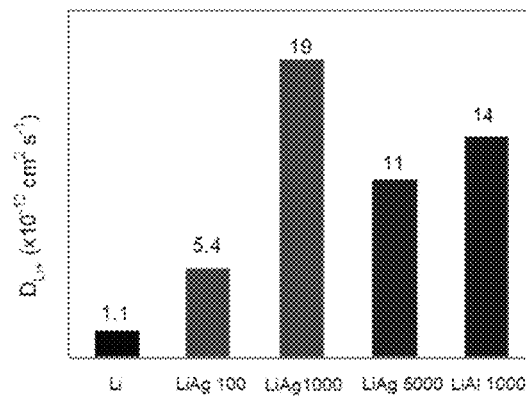
FIG. 6A illustrates a graph comparing the diffusion coefficient of lithium, and doped lithium with different dopants and different dopant concentrations.
Figure 6B:
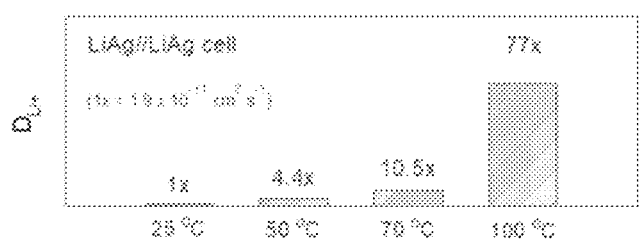
FIG. 6B illustrates a graph of the diffusion coefficients of doped lithium cells at different temperatures.
Figure 6C:
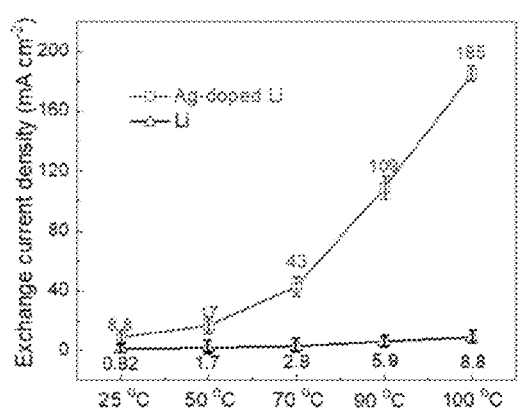
FIG. 6C illustrates a graph of the exchange current density for lithium cells and doped lithium cells.
Figure 6D:
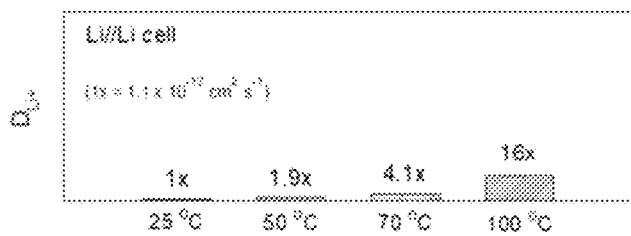
FIG. 6D illustrates a graph of the diffusion coefficients of lithium cells at different temperatures.

The effect of the dopants on the fundamental electrochemical behavior of lithium metal was examined using EIS, and the charge transport properties at the metallic Li/electrolyte interphases was quantified. FIG. 6A compares the Nyquist plot of symmetric coin cells composed of identical electrodes (doped or pristine lithium) and the 1.0M LiPF$_6$ in EC/DMC electrolytes. These spectra were fitted using the equivalent circuit model to decouple the $R_{ct}$ and $D_{Li+}$ (Li$^+$ ions diffusion coefficient). All of the doped Li electrodes exhibited smaller $R_{ct}$ and higher $D_{Li+}$ compared with pristine lithium electrodes (FIG. 6B-C), implying that the doping effectively promoted charge transport at the electrode interface. Notably, the 0.1 percent silver doped lithium electrode has the fastest kinetics, evidenced with the lowest $R_{ct}$ and highest $D_{Li+}$ (1.9×10$^{-11}$ cm$^2$ s$^{-1}$) that are approximately 0.5 and 17 times compared with pristine lithium electrodes, respectively. The interfacial transport of doped lithium electrodes become even faster as the temperature was increased, and the $D_{Li+}$ was more than 80 times higher than pristine lithium at 100° C. These results demonstrate that the doped lithium electrodes have promoted ion transport and suggesting intrinsic higher electrochemical activity due to the incorporation of dopant.

The electrochemical behavior of the symmetric 0.1 atomic percent Ag doped lithium electrodes were further evaluated using cyclic voltammetry (CV) in the voltage range of −0.1 to 0.1 V. They show typical Li+/Li polarization curves and no redox peaks attributable to side-reactions were observed, confirming the silver dopants didn't affect the redox properties of metallic lithium. The polarization curves from the doped electrodes have markedly higher slopes, which indicates promoted redox kinetics that agree with EIS results discussed above. The current-overpotential data of these CV results were analyzed using the Tafel relationship and the exchange current densities were estimated. The Li+/Li exchange current for the pristine and doped lithium electrodes with 0.02, 0.1 and 1.0 percent of silver were 0.82, 4.6, 8.8 and 3.3 mA cm$^{-2}$, respectively, which confirms that the lithium doped with 0.1 percent silver has the best kinetics. Such differences were more pronounced at elevated temperatures, and the exchange current at 100° C. for 0.1 percent silver doped lithium was more than twenty times higher than pristine lithium (185 vs. 8.8 mA cm$^{-2}$). Since the most pronounced results were obtained from electrodes with 0.1 percent silver doping, this sample was studied in detail as discussed below and will be referred as Ag—Li hereafter.

Advantages of the Doped Lithium as Metal Anodes

Figure 7A:
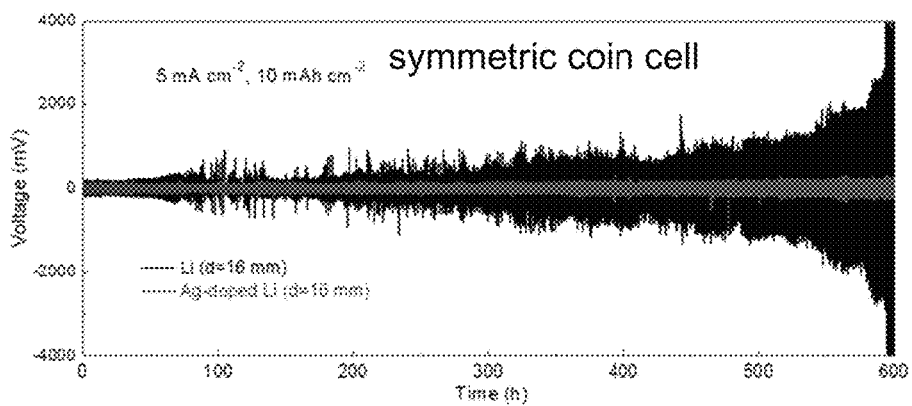
FIG. 7A illustrates a graph of voltage profiles of symmetric coin cells that were cycled at 5 mA cm$^{-2}$ for a capacity of 10 mAh cm$^{-2}$ for lithium and lithium doped with 0.1 mol % Ag.
Figure 7B:
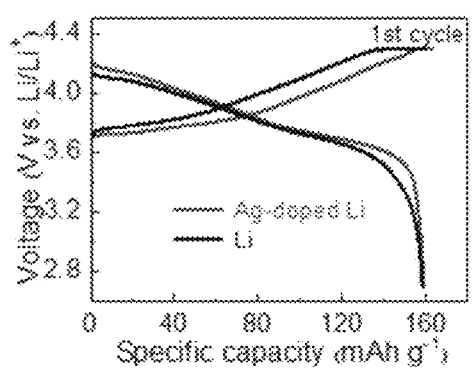
FIG. 7B illustrates a graph of the voltage profiles for lithium and lithium doped with 0.1 mol % Ag after a first cycle and after a 200th cycle.
Figure 7C:
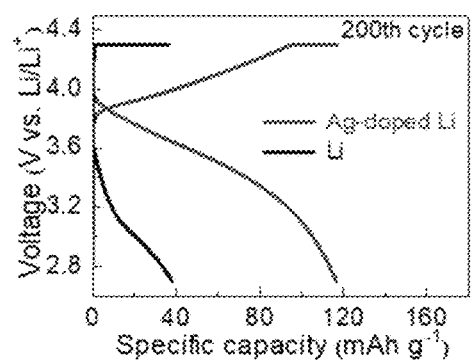
FIG. 7C illustrates a graph of the voltage profiles for lithium and lithium doped with 0.1 mol % Ag after a 200th cycle.
Figure 7D:
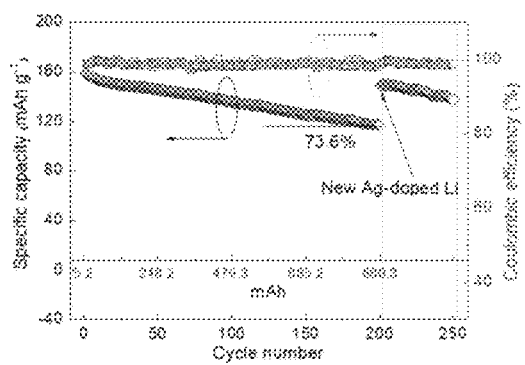
FIG. 7D illustrates the cyclic stability of lithium doped with 0.1 mol % Ag metal batteries assembled with high loading NMC-811 cathodes.
Figure 7E:
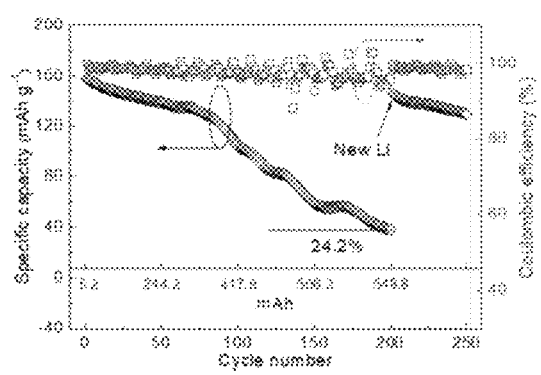
FIG. 7E illustrates the cyclic stability of lithium metal batteries assembled with high loading NMC811 cathodes.

The doped lithium electrodes enabled more robust lithium metal batteries as observed with substantially improved interphasical stability in both carbonate and ether electrolytes and prototype metal batteries. FIG. 7A demonstrates that the Ag—Li electrodes have sustained stable cycling in a symmetric configuration at a practical current density of 5.0 mA cm$^{-2}$ and a capacity of 10 mAh cm$^{-2}$ (2.0 cm$^2$ electrode). The cell exhibited very stable profiles with no sudden voltage drops or spikes during the 600 hours of cycling, which is in sharp contrast of pristine lithium electrodes that exhibit clear failure within 100 hours. Similar stability was also observed with the cycling of symmetric cells at 3.0 and 4.0 mA cm$^{-2}$. FIG. 7B-7E illustrate the behavior of lithium metal batteries in which the lithium anodes were paired with the state-of-the art intercalation cathode LiNi$_{0.1}$Mn$_{0.1}$Co$_{0.1}$O$_2$ (NMC 811) with a loading of 1.5 mAh cm$^{-2}$ (3.0 mAh per electrode). As expected, the Ag—Li anode afforded significantly improved stability and a capacity retention of 73.6% is observed over 200 cycles at 1.0 C and the coulombic efficiency (CE) maintained at nearly unity. In contrast, the control battery with pristine lithium electrode only had 24% of retention and rapid capacity decays after ~100 cycles were commonly observed, which is now widely accepted as lithium metal failure.

Figure 8A:
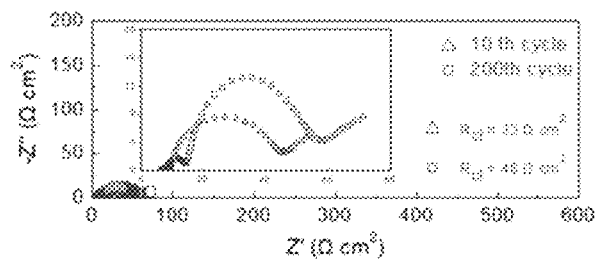
FIG. 8A illustrates a Nyquist plot of lithium metal batteries with NMC-811 cathodes after different numbers of cycles.
Figure 8B:
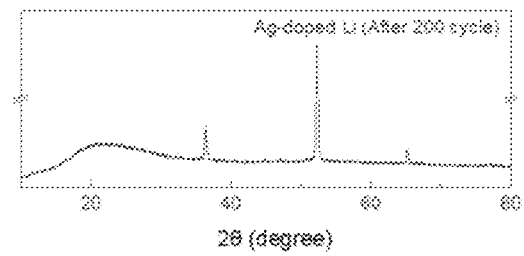
FIG. 8B illustrates an XRD pattern of doped Li anodes after 200 cycles.
Figure 8C:
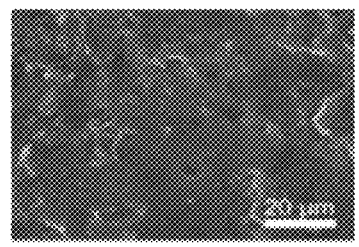
FIG. 8C illustrates a scanning electron microscope (SEM) image of a doped Li anode after 200 cycles.
Figure 8D:
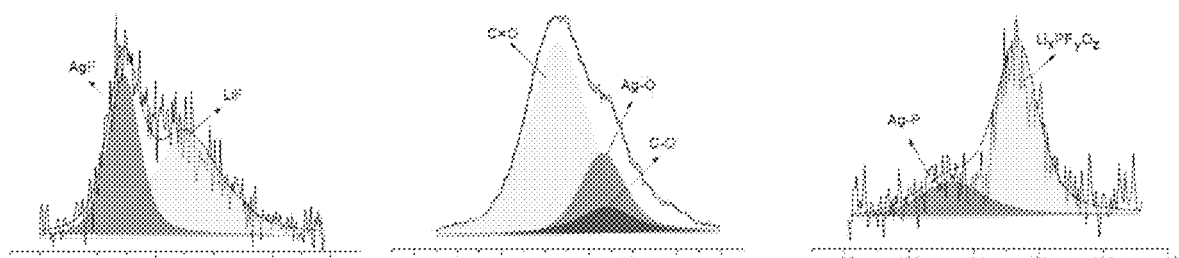
FIG. 8D illustrates X-ray photoelectron spectroscopy (XPS) regional spectra of doped Li anodes after 200 cycles.
Figure 8E:
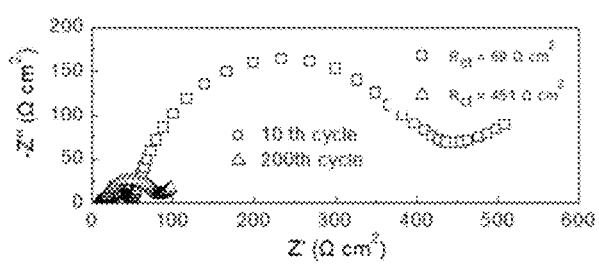
FIG. 8E illustrates a Nyquist plot of lithium metal batteries with NMC-811 cathodes after different numbers of cycles.
Figure 8F:
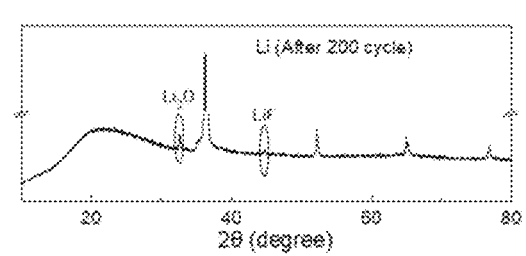
FIG. 8F illustrates an XRD pattern of pristine Li anodes after 200 cycles.
Figure 8G:
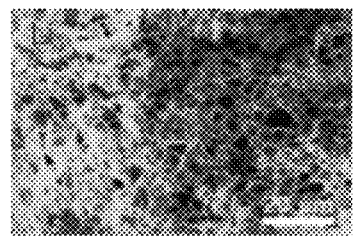
FIG. 8G illustrates a scanning electron microscope (SEM) image of a pristine Li anode after 200 cycles.

The impedance analysis of these batteries during cycling (FIG. 8A) reveals that the Ag—Li anode maintained stabilized interface, and the increases in R$_{ct}$ was only ~50% (33 to 45 Ωcm$^{-2}$) whereas the pristine lithium anode increased to a much higher value of 450 Ωcm$^{-2}$ during the 200 cycles. Post-mortem XRD analysis of the lithium electrodes reveals that the cycled Ag—Li anode only has diffraction peaks from crystalline Li (FIG. 8B), as opposed with the strong peaks from crystalline Li$_2$O and LiF generated on the pristine lithium electrode. The SEI layers formed on Ag—Li electrode have a flat surface morphology and were much thinner compared to the pristine lithium (FIG. 8C). The SEI layers formed on Ag—Li electrode appeared very dense, did not have a porous structure, and adhered to the underlying metallic lithium strongly. These results agree with the stable R$_{ct}$ observed with EIS. The XPS analysis of the SEI layers (FIG. 8D) reveals substantial levels of silver compounds that includes AgF, AgO and AgPx, and likely these compounds contributed to the formation of stabilized SEI.

In addition to lithium electrodes with ~450 μm thickness, we explored the possibility of using ~30 μm electrodes that are required to implement a high-energy Li metal battery (anode/cathode capacity ratio is ~3:1). The Ag—Li/NMC cells in this case were able to cycle stably for over 100 cycles, whereas the control cell with pristine lithium quickly failed within 20 cycles.

Figure 9A:
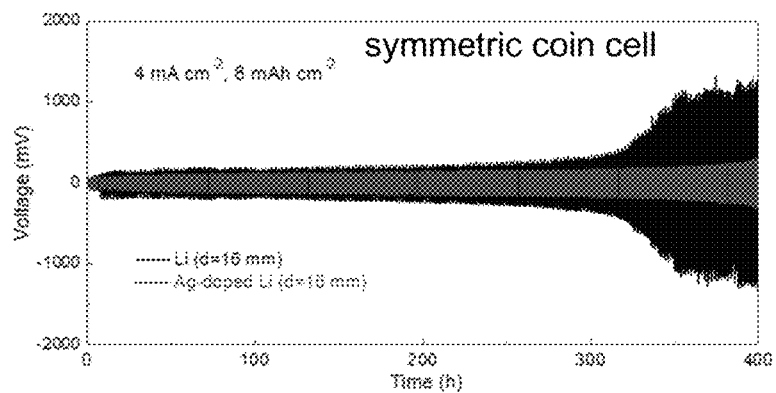
FIG. 9A illustrates a comparison of voltage profiles of symmetric coin cells cycled at 4 mA cm$^{-2}$ for a capacity of 8 mAh cm$^{-2}$ for pristine lithium anodes and lithium metal doped with 0.1 mol % Ag anodes.
Figure 9C:
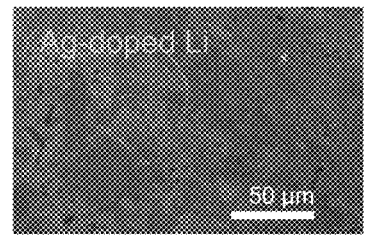
FIG. 9C illustrates SEM images of the lithium metal doped with 0.1 mol % Ag anode after 300 cycles.
Figure 9B:
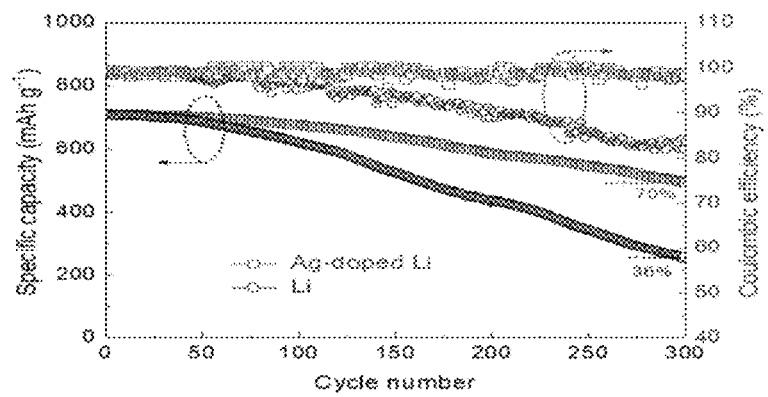
FIG. 9B illustrates comparison of cyclic stability of Li—S batteries assembled with doped and pristine Li anodes.
Figure 9D:
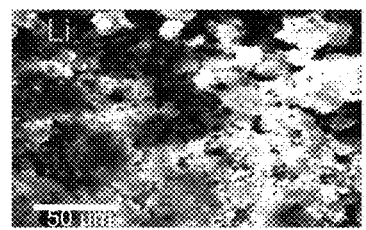
FIG. 9D illustrates SEM images of the pristine lithium metal anode after 300 cycles.
Figure 9E:
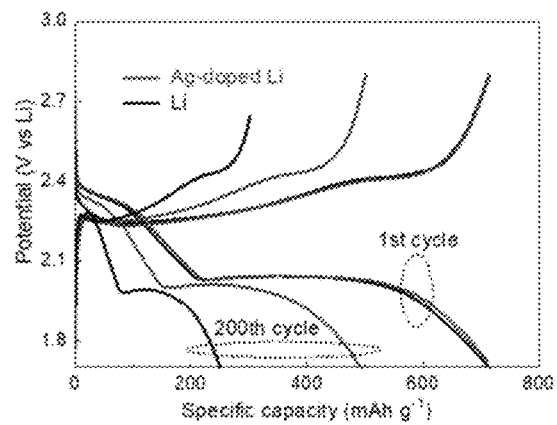
FIG. 9E illustrates a graph comparing the voltage values of pristine lithium anodes and lithium metal doped with 0.1 mol % Ag anodes.

The Ag—Li electrodes also exhibited substantially improved stability in the ether electrolyte for Li—S batteries (1.0M LiTFSI in DOL/DME). FIG. 9A shows the voltage profile of Ag—Li and lithium symmetric cells with 2.0 cm$^2$ electrodes that were cycled at 4.0 mA cm$^{-2}$ for a high capacity of 8.0 mAh cm$^{-2}$ each cycle. The Ag—Li electrodes show very stable voltage profile along with nearly no voltage fluctuations, as opposed to the pristine lithium electrodes that failed within 300 hours as signaled by sharp increases in overpotential. FIG. 9B shows the performance of Ag—Li anodes cycled with conventional sulfur cathodes prepared with sulfur impregnated in KB carbon black (2.5 mg cm$^{-2}$ sulfur loading). These cathodes were used because they slowly release soluble lithium polysulfide to the electrolyte and create harsh conditions at the lithium metal anode, and therefore are a better system for examining lithium metal stability. These cells were cycled at a rate of 1 C, and the cell with Ag—Li anode delivered much better cyclic stability, with an overall retention of 70% while the cell with pristine lithium electrode only retained 36% under the same condition (FIG. 9B). Post-mortem SEM analysis of the cycled lithium electrode confirms the outstanding cyclic stability of the Ag—Li, and its surface remained dense without formation of porous or dendritic structures (FIG. 9C-D). FIG. 9E compares the voltage profiles of the doped and pristine lithium anodes in this system. While initially the doped and pristine lithium have identical profiles, after 200 cycles the voltage profiles differ greatly, with the doped lithium voltage profile being more similar to the initial voltage profiles than the pristine lithium.

Figure 10:
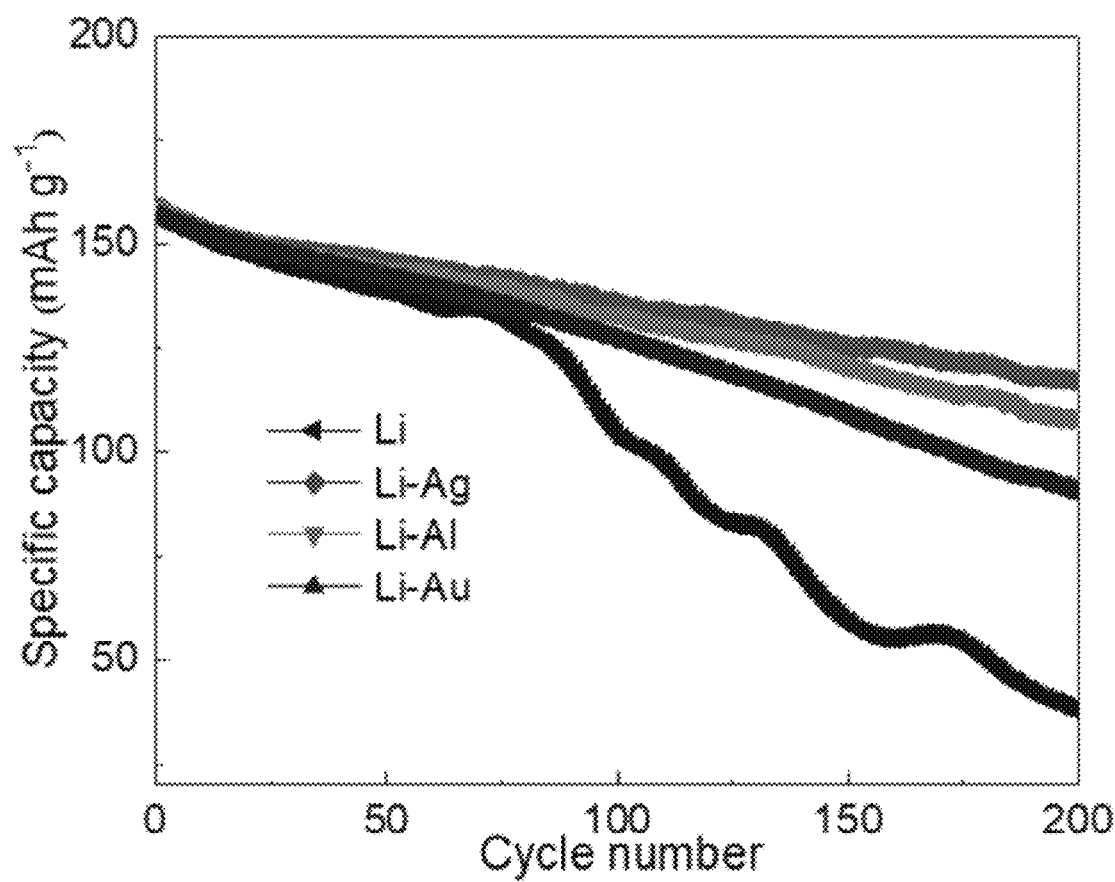
FIG. 10 illustrates a graph of the specific capacity of batteries against the number of battery cycles for batteries with various anodes.

FIG. 10 demonstrates that dopants of silver, gold, and aluminum each improve the stability of a lithium anode. The anodes of FIG. 10 were paired with a cathode of NMC-811 (3.0 mAh per electrode) and the electrolyte was LiPF$_6$ in EC/DEC. As the number of cycles increased, lithium doped with aluminum, silver and gold all display a greater retention of their specific capacity compared to pristine lithium.

Figure 11:
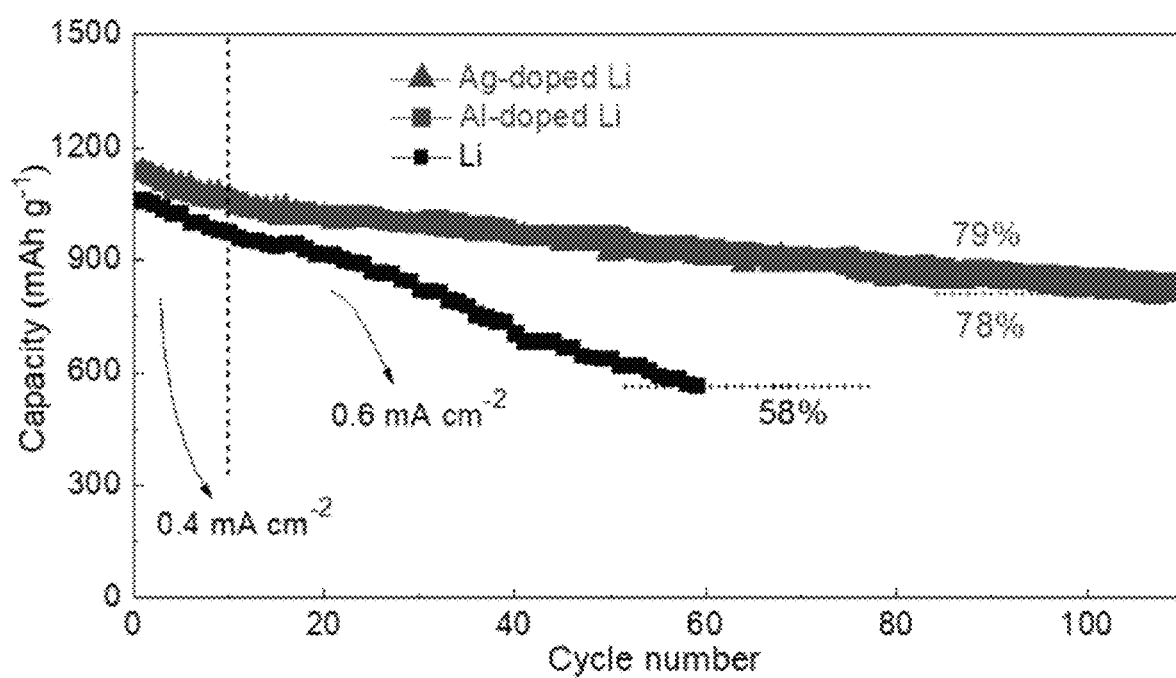
FIG. 11 illustrates a graph of the capacity of batteries against the number of battery cycles for batteries with various anodes.

FIG. 11 demonstrates that doped lithium anodes improve stability in Li—S batteries. Li—S batteries using anodes of lithium doped with aluminum or silver maintained their capacity more than pristine lithium. After 60 cycles the Li—S battery with pristine lithium only retained 58% of its initial capacity. In comparison, Li—Ag and Li—Al retained 78% and 79%, respectively, after 90 cycles.

Figure 12:
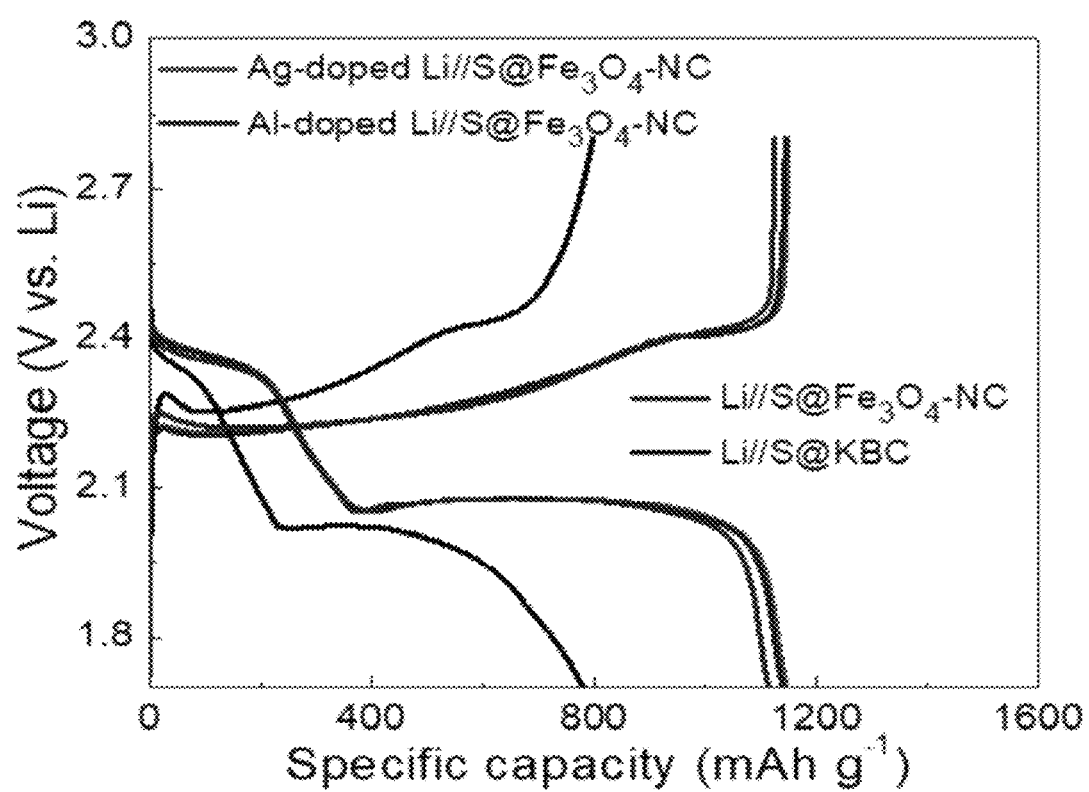
FIG. 12 illustrates a graph of the initial voltage profiles of various lithium anodes.
Figure 13:
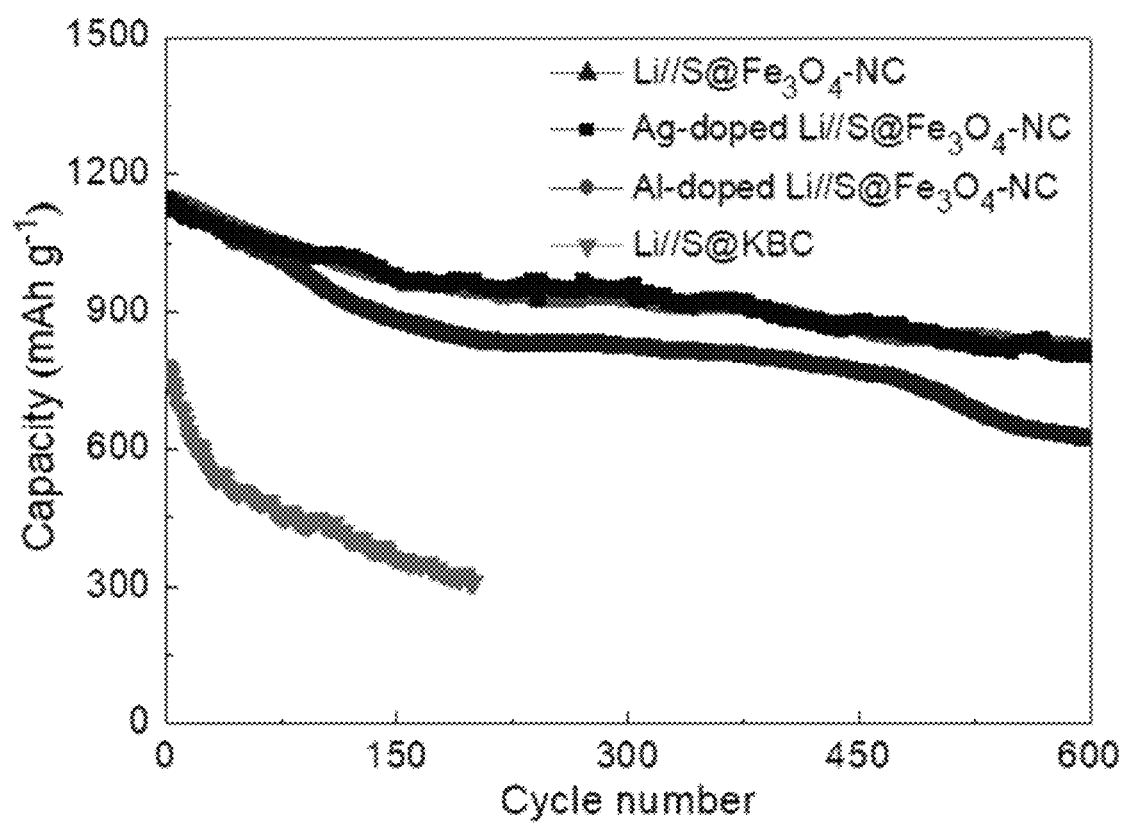
FIG. 13 illustrates a graph of the capacity of batteries using various lithium anodes over the number of battery cycles.

FIG. 12 shows the initial voltage profiles of lithium metal batteries that use a S@Fe$_3$O$_4$—NC cathode paired with an aluminum doped lithium anode, a silver doped lithium anode, and a pristine lithium anode. The S@Fe$_3$O$_4$—NC cathode includes sulfur, nitrogen doped carbon, and Fe$_3$O$_4$ (see, citation [4] to Lu et al.). FIG. 12 also shows the initial voltage profile of a battery with a pristine lithium anode and a Ketjen black carbon (KBC) cathode. FIG. 13 demonstrates that cells using the doped lithium metal retained a much greater percentage of their initial capacity compared to the batteries using pristine lithium metal as the anode. The batteries using the S@Fe$_3$O$_4$—NC cathode also exhibited improved capacity retention compared to the KBC cathode.

Figure 14A:
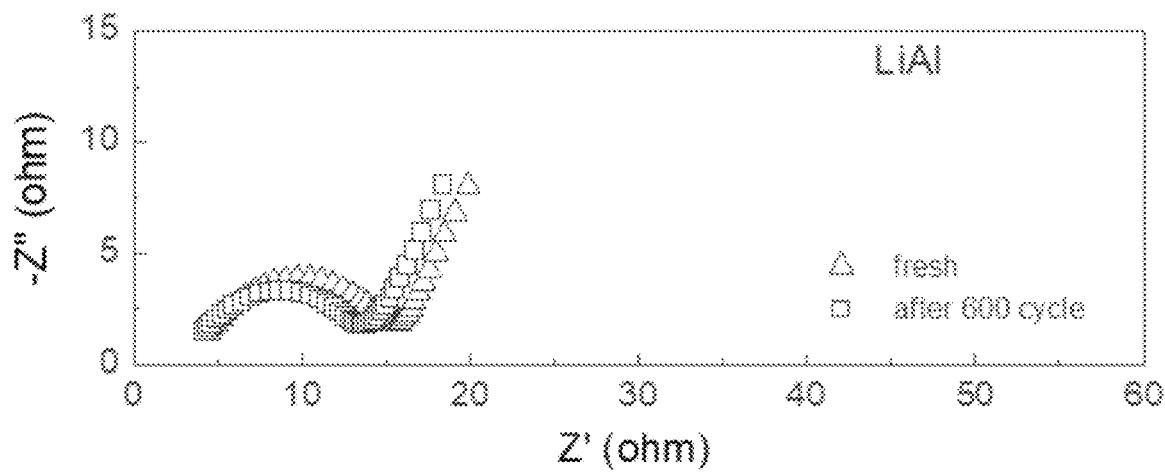
FIG. 14A illustrates a graph of the change in resistance over the number of cycles for aluminum doped lithium.
Figure 14B:
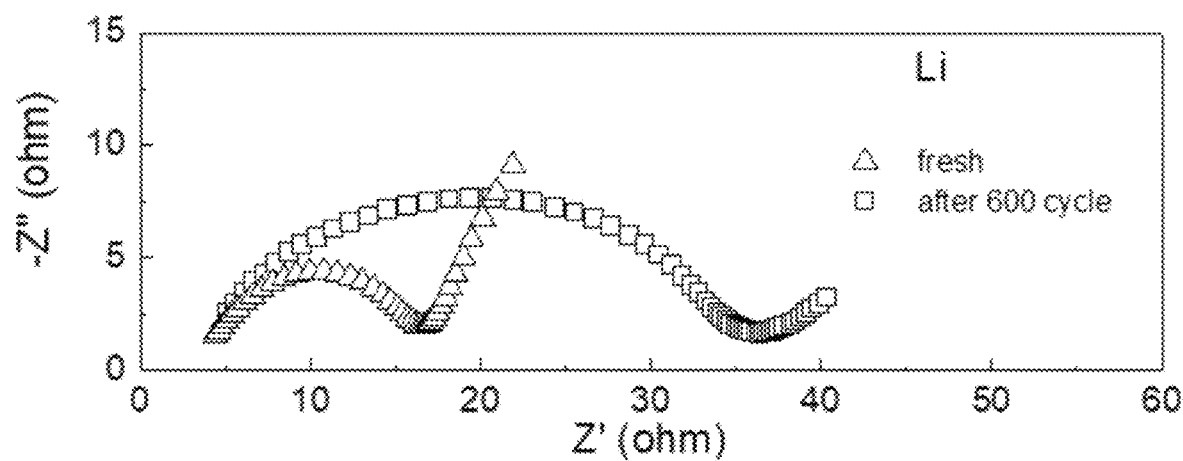
FIG. 14B illustrates a graph of the change in resistance over the number of cycles for pristine lithium.
Figure 15A:
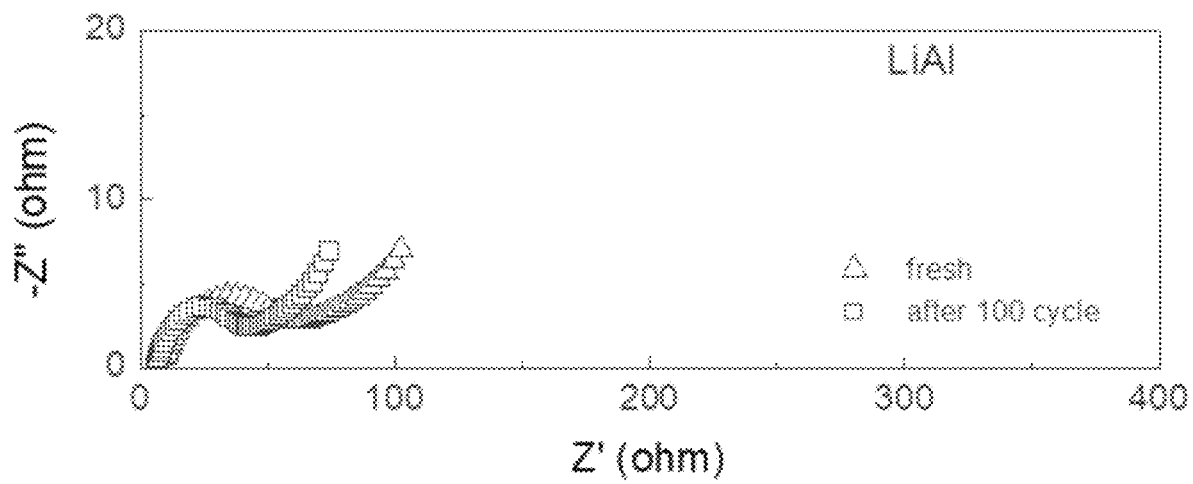
FIG. 15A illustrates a graph of the change in resistance over the number of cycles for aluminum doped lithium.
Figure 15B:
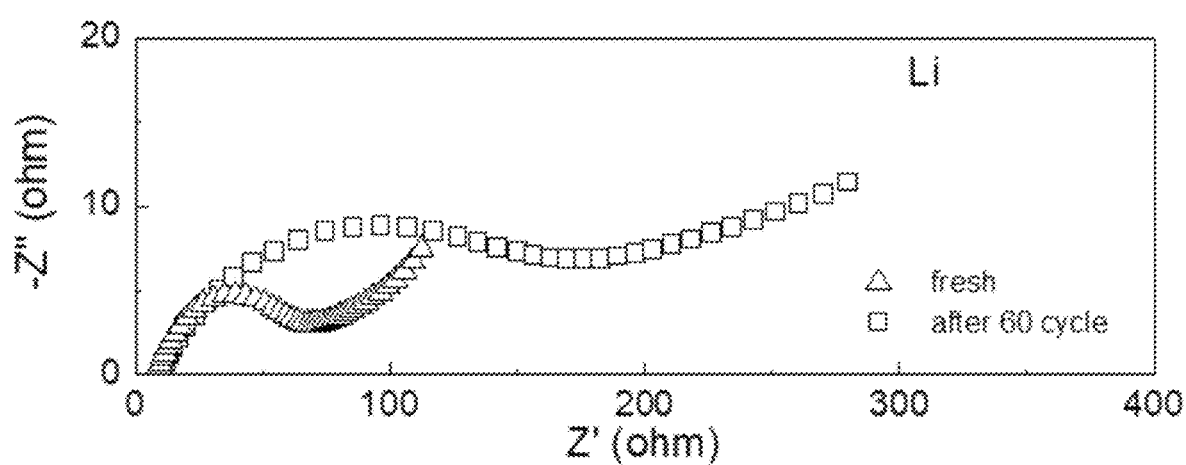
FIG. 15B illustrates a graph of the change in resistance over the number of cycles for pristine lithium.

The cells using doped lithium metal as the anode also have less resistance change after the battery is cycled. FIGS. 14A and 14B show that aluminum doped lithium anode cells have nearly no change in the resistance after 600 cycles. FIGS. 15A and 15B also show that aluminum doped lithium anode cells have nearly no change in the resistance, as the profile of pristine lithium has a drastic change after 60 cycles, while the profile of the aluminum doped lithium shows only a small change after 100 cycles. These observations are similar in batteries tested with flooded electrolyte levels. The term flooded electrolyte refers to the use of substantially higher volume of electrolytes than industrial standards, which is usually quantified using a term called E/S ratio (electrolyte/cathode ratio).

Figure 16A:
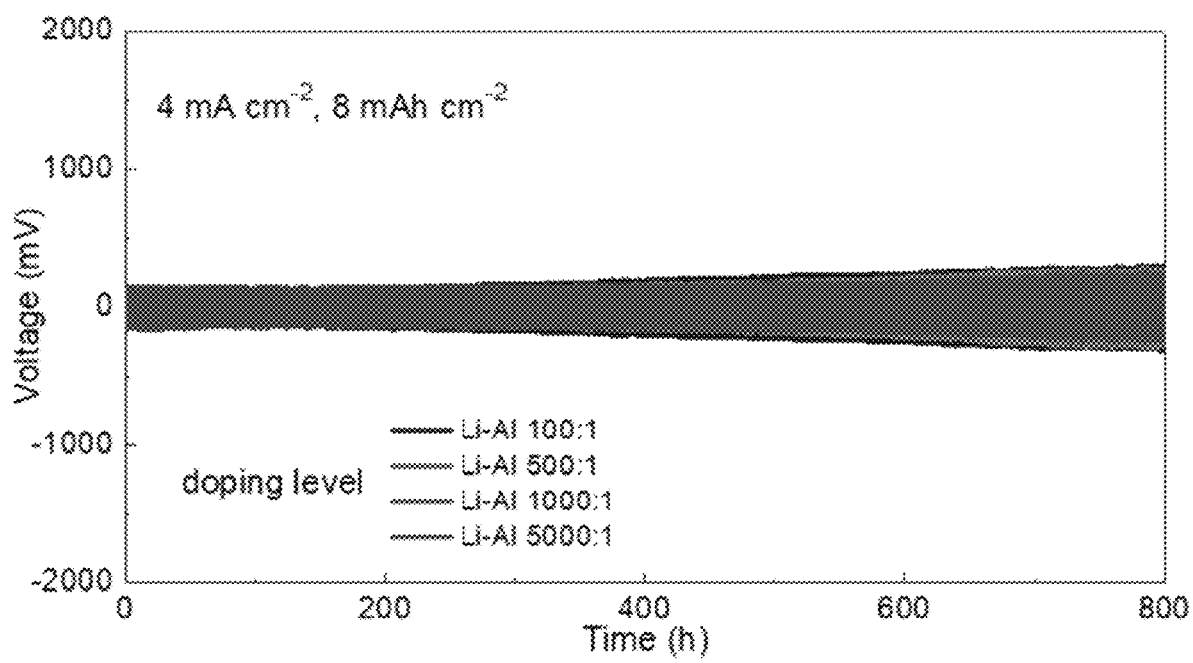
FIG. 16A illustrates a graph of the voltage over time for a coin cell that includes an aluminum doped lithium anode.
Figure 16B:
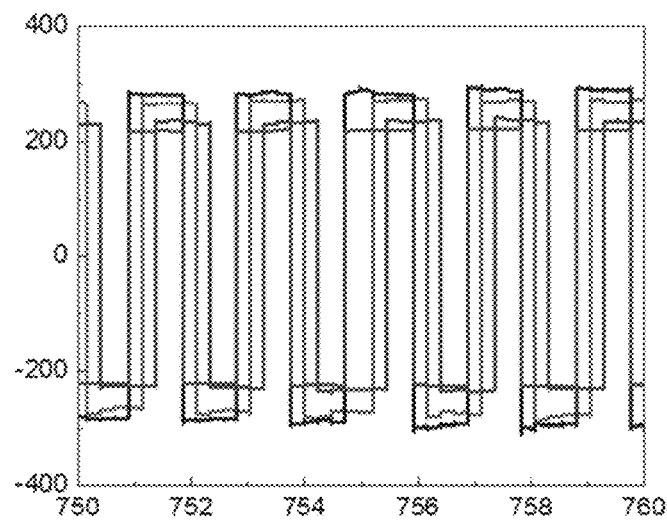
FIG. 16B illustrates an enlarged portion of the graph of FIG. 16A at approximately 250 cycles.

FIGS. 16A and 16B demonstrate that the aluminum doped lithium anode cells have great stability over time as well. 1.0, 0.2, 0.1, and 0.02 percent aluminum doped lithium anodes were tested. All the dopant percentages exhibited excellent stability over time, with 0.1 percent aluminum showing the greatest stability.

Figure 17:
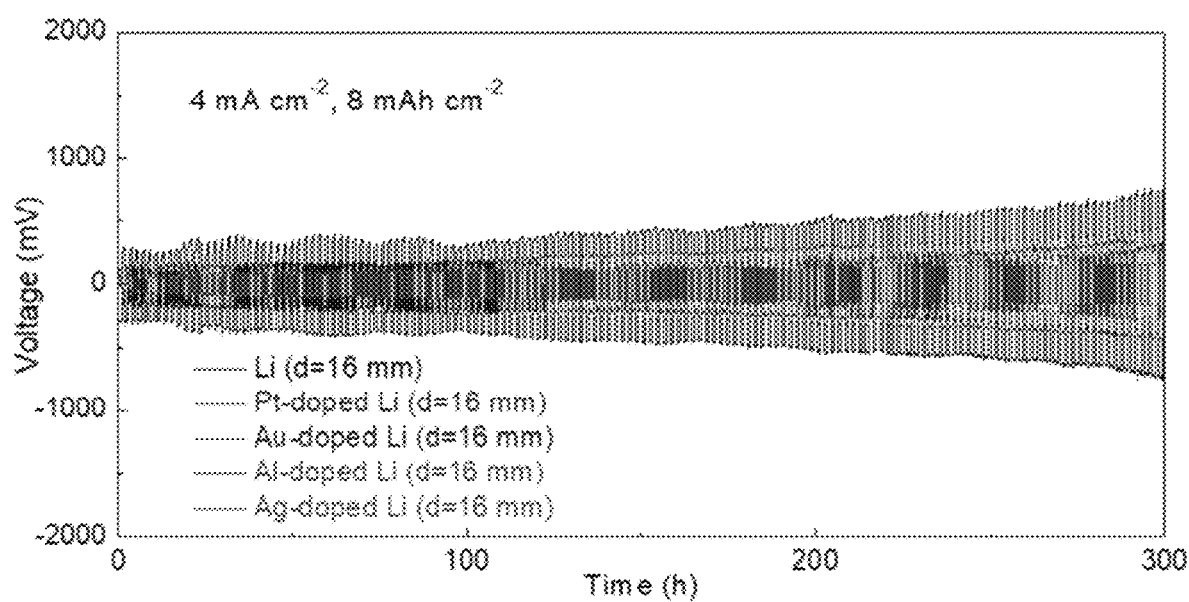
FIG. 17 illustrates a graph of the voltage over time for coin cells that include various doped lithium anodes and a pristine lithium anode.
Figure 18:
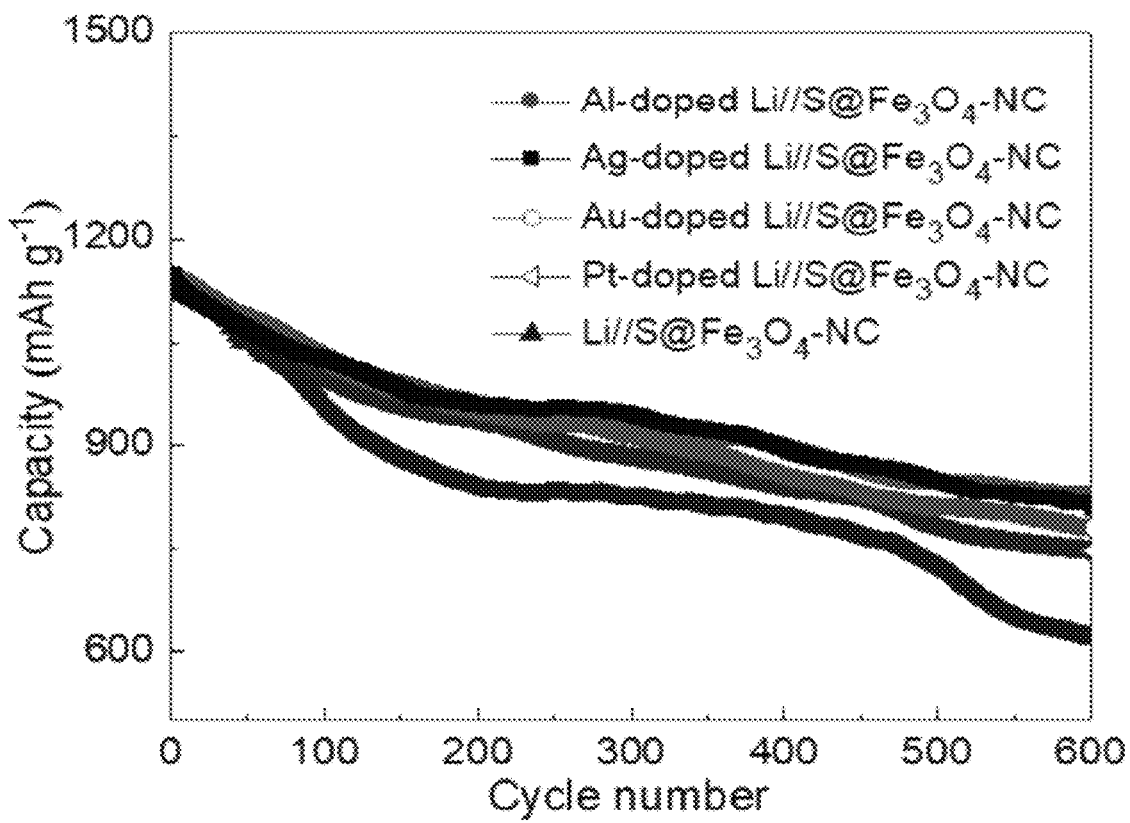
FIG. 18 illustrates a graph of the capacity over the number of cycles for cells that include various doped lithium anodes and a pristine lithium anode.

FIG. 17 demonstrates doped lithium anodes improve the battery stability over time. Dopants, such as aluminum, gold, platinum, and silver, all exhibited improved stability, compared to pristine lithium. FIG. 18 shows that batteries using the doped lithium anodes also exhibited improved capacity retention.

Figure 19:
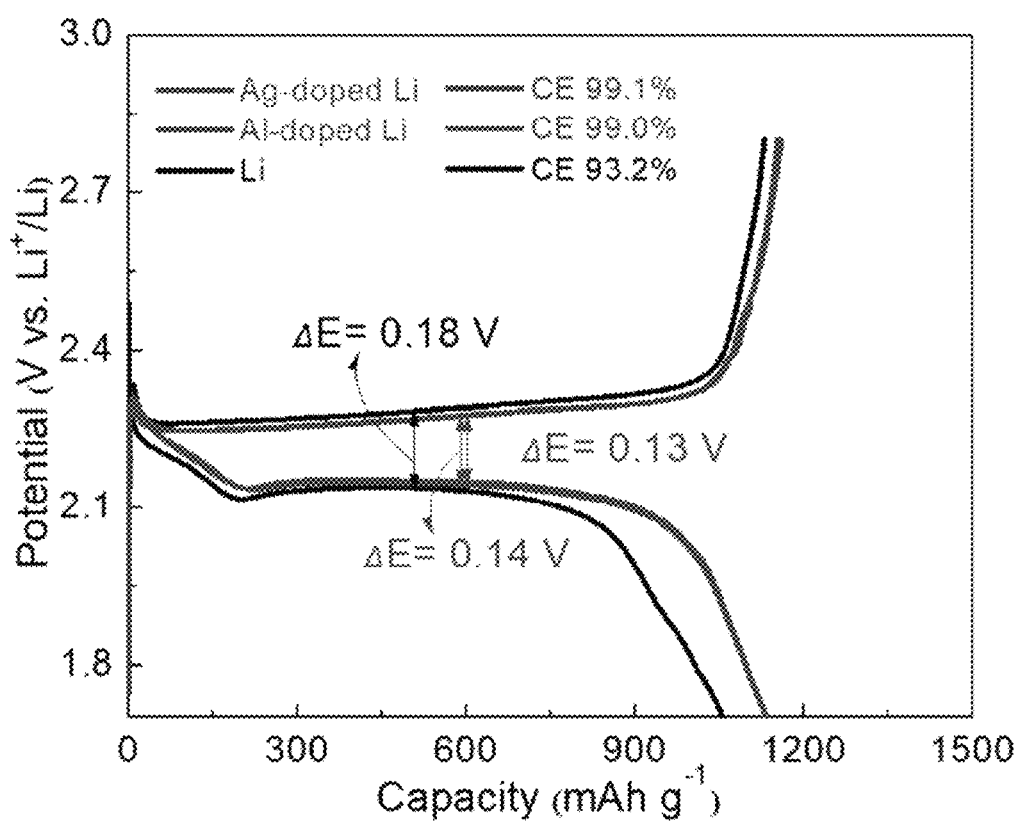
FIG. 19 illustrates a graph of the initial voltage profiles of anodes of silver doped lithium, aluminum doped lithium, and pristine lithium, and the anode is paired with a sulfur cathode.
Figure 20:
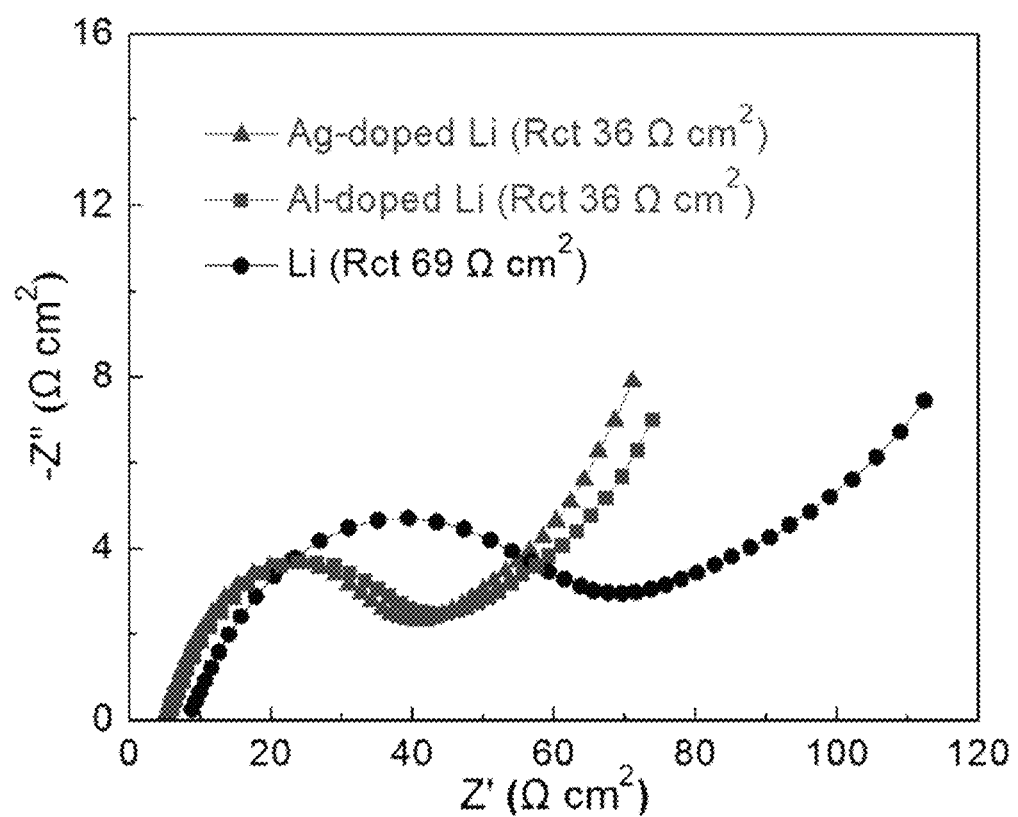
FIG. 20 illustrates the initial impedance profiles of silver doped lithium, aluminum doped lithium, and pristine lithium, and the anode is paired with a sulfur cathode.

FIG. 19 demonstrates the initial voltage profiles of aluminum doped lithium, silver doped lithium, and pristine lithium. The doped lithium anodes exhibit better kinetics (smaller polarization), and the doped lithium anodes enable the battery to have higher capacity and an increased efficiency. FIG. 20 demonstrates the initial impedance profiles of the batteries. The initial impedance profiles show that the doped lithium anodes have better kinetics (smaller charge-transfer resistance).

The surface electrolyte interface of the doped lithium anode is denser than a pristine lithium anode. FIG. 21A shows an aluminum doped lithium anode, while FIG. 21C shows a pristine lithium anode. The anode in FIG. 21C is much more porous, while the doped lithium anode of FIG.

21A is denser. As a result, the SEI is thinner for the doped lithium anode, which can be seen by comparing FIG. 21B, showing the doped lithium anode, to FIG. 21D, which shows the pristine lithium anode.

REFERENCES

1 Whittingham, M. S. Ultimate Limits to Intercalation Reactions for Lithium Batteries. *Chemical Reviews* 114, 11414-11443, doi:10.1021/cr5003003 (2014).
2 Yang, Z. et al. Electrochemical Energy Storage for Green Grid. *Chemical Reviews* 111, 3577-3613, doi:10.1021/cr100290v (2011).
3 Scrosati, B., Hassoun, J. & Sun, Y.-K. Lithium-ion batteries. A look into the future. *Energy & Environmental Science* 4, 3287-3295, doi:10.1039/C1EE01388B (2011).
4 Lu, K. et al. Manipulating Polysulfide Conversion with Strongly Coupled $Fe_3O_4$ and Nitrogen Doped Carbon for Stable and High Capacity Lithium-Sulfur Batteries. *Advanced Functional Materials* 29, 1807309, doi: 10.1002/adfm.201807309 (2019).
5 Albertus, P., Babinec, S., Litzelman, S. & Newman, A. Status and challenges in enabling the lithium metal electrode for high-energy and low-cost rechargeable batteries. *Nature Energy* 3, 16-21, doi:10.1038/s41560-017-0047-2 (2018).
6 Lin, D., Liu, Y. & Cui, Y. Reviving the lithium metal anode for high-energy batteries. *Nature Nanotechnology* 12, 194, doi:10.1038/nnano.2017.16 (2017).
7 Xu, W. et al. Lithium metal anodes for rechargeable batteries. *Energy & Environmental Science* 7, 513-537, doi:10.1039/C3EE40795K (2014).
8 Cheng, X.-B., Zhang, R., Zhao, C.-Z. & Zhang, Q. Toward Safe Lithium Metal Anode in Rechargeable Batteries: A Review. *Chemical Reviews* 117, 10403-10473, doi: 10.1021/acs.chemrev.7b00115 (2017).
9 Qian, J. et al. High rate and stable cycling of lithium metal anode. *Nature Communications* 6, 6362, doi:10.1038/ncomms7362 https://www.nature.com/articles/ncomms7362#supplementary-information (2015).
10 Zheng, J. et al. Electrolyte additive enabled fast charging and stable cycling lithium metal batteries. *Nature Energy* 2, 17012, doi:10.1038/nenergy.2017.12 https://www.nature.com/articles/nenergy201712#supplementary-information (2017).
11 Tikekar, M. D., Choudhury, S., Tu, Z. & Archer, L. A. Design principles for electrolytes and interfaces for stable lithium-metal batteries. *Nature Energy* 1, doi:10.1038/nenergy.2016.114 (2016).
12 Aurbach, D., Zinigrad, E., Cohen, Y. & Teller, H. A short review of failure mechanisms of lithium metal and lithiated graphite anodes in liquid electrolyte solutions. *Solid State Ionics* 148, 405-416, doi:https://dolorg/10.1016/S0167-2738(02)00080-2 (2002).
13 Bieker, G., Winter, M. & Bieker, P. Electrochemical in situ investigations of SEI and dendrite formation on the lithium metal anode. *Physical Chemistry Chemical Physics* 17, 8670-8679, doi:10.1039/C4CP05865H (2015).
14 Lu, D. et al. Failure Mechanism for Fast-Charged Lithium Metal Batteries with Liquid Electrolytes. *Advanced Energy Materials* 5, 1400993, doi:10.1002/aenm.201400993 (2014).
15 Aurbach, D., Zinigrad, E., Teller, H. & Dan, P. Factors Which Limit the Cycle Life of Rechargeable Lithium (Metal) Batteries. 147, 1274-1279, doi:10.1149/1.1393349 (2000).
16 Li, G. et al. Stable metal battery anodes enabled by polyethylenimine sponge hosts by way of electrokinetic effects. *Nature Energy* 3, 1076-1083, doi:10.1038/s41560-018-0276-z (2018).
17 Wei, S., Choudhury, S., Tu, Z., Zhang, K. & Archer, L. A. Electrochemical Interphases for High-Energy Storage Using Reactive Metal Anodes. *Accounts of Chemical Research* 51, 80-88, doi:10.1021/acs.accounts.7b00484 (2018).
18 Xin, S. et al. Solid-State Lithium Metal Batteries Promoted by Nanotechnology: Progress and Prospects. *ACS Energy Letters* 2, 1385-1394, doi:10.1021/acsenergylett.7b00175 (2017).
19 Li, N. W., Yin, Y. X., Yang, C. P. & Guo, Y. G. An Artificial Solid Electrolyte Interphase Layer for Stable Lithium Metal Anodes. *Adv Mater* 28, 1853-1858, doi: 10.1002/adma.201504526 (2016).
20 Liang, J. et al. In Situ Li3 PS4 Solid-State Electrolyte Protection Layers for Superior Long-Life and High-Rate Lithium-Metal Anodes. *Adv Mater*, e1804684, doi: 10.1002/adma.201804684 (2018).
21 Kim, M. S. et al. Langmuir-Blodgett artificial solid-electrolyte interphases for practical lithium metal batteries. *Nature Energy* 3, 889-898, doi:10.1038/s41560-018-0237-6 (2018).
22 Jiao, S. et al. Stable cycling of high-voltage lithium metal batteries in ether electrolytes. *Nature Energy*, doi: 10.1038/s41560-018-0199-8 (2018).
23 Slotboom, J. W. & de Graaff, H. C. Measurements of bandgap narrowing in Si bipolar transistors. *Solid-State Electronics* 19, 857-862, doi:https://doi.org/10.1016/0038-1101(76)90043-5 (1976).
24 Jensen, T., Diening, A., Huber, G. & Chai, B. H. T. Investigation of diode-pumped 2.8-µm Er:LiYF4 lasers with various doping levels. *Opt. Lett* 21, 585-587, doi: 10.1364/OL.21.000585 (1996).
25 Bang, H. J., Kim, S. & Prakash, J. Electrochemical investigations of lithium-aluminum alloy anode in Li/polymer cells. *Journal of Power Sources* 92, 45-49, doi:https://doi.org/10.1016/S0378-7753(00)00522-X (2001).
26 Stark, J. K., Ding, Y. & Kohl, P. A. Dendrite-Free Electrodeposition and Reoxidation of Lithium-Sodium Alloy for Metal-Anode Battery. 158, A1100-A1105, doi: 10.1149/1.3622348 (2011).
27 Xu, T. et al. Synthesis of Supported Platinum Nanoparticles from Li—Pt Solid Solution. *Journal of the American Chemical Society* 132, 2151-2153, doi:10.1021/ja909442c (2010).
28 Barkholtz, H. M. et al. Lithium Assisted "Dissolution-Alloying" Synthesis of Nanoalloys from Individual Bulk Metals. *Chemistry of Materials* 28, 2267-2277, doi: 10.1021/acs.chemmater.6b00216 (2016).
29 Pelton, A. D. The Ag—Li (Silver-Lithium) system. *Bulletin of Alloy Phase Diagrams* 7, 223-228, doi: 10.1007/BF02868993 (1986).
30 Kozen, A. C. et al. Next-Generation Lithium Metal Anode Engineering via Atomic Layer Deposition. *ACS Nano* 9, 5884-5892, doi:10.1021/acsnano.5b02166 (2015).
31 Li, G. et al. Self-Formed Hybrid Interphase Layer on Lithium Metal for High-Performance Lithium-Sulfur Batteries. *ACS Nano* 12, 1500-1507, doi:10.1021/acsnano.7b08035 (2018).

32 Bensalah N, Dawood H Review on Synthesis, Characterizations, and Electrochemical Properties of Cathode Materials for Lithium Ion Batteries. *J Material Sci Eng* 5: 258 (2016).
33 Arora, P. et al., Battery Separators *Chemical Reviews* 104 (10), pg. 4419-4462 (2004).
34 Schroder et al., Comparatively assessing different shapes of lithium-ion battery cells, *ScienceDirect Procedia Manufacturing* 8 pg 104-111 (2017).
35 Cao et al., Recent advances in inorganic solid electrolytes for lithium batteries, *Front. Energy Res.*, vol. 2-25 (2014).

What is claimed is:

1. An anode, comprising:
    lithium metal, and
    a dopant, in the lithium metal,
    wherein the anode has a thickness of at most 50 µm, and
    the dopant is a metal with an electronegativity greater than lithium.
2. The anode of claim 1, wherein the dopant is present in an amount of 0.02 to 1.0 atomic percent.
3. The anode of claim 1, wherein the dopant is present in an amount of at most 0.2 atomic percent.
4. The anode of claim 1, wherein the anode has a thickness of at most 30 µm.
5. The anode of claim 1, wherein the dopant is a metal selected from the group consisting of: aluminum, silver, gold, platinum, tin, bismuth, copper, indium, zinc, nickel and mixtures thereof.
6. The anode of claim 1, wherein the anode demonstrates stability in dry air.
7. The anode of claim 1, wherein the anode passes the improved charge transport test.
8. A battery comprising:
    an anode,
    an anode charge collecting element in contact with the anode
    a cathode,
    a cathode charge collecting element in contact with the cathode, and
    an electrolyte in contact with the anode and the cathode, and a housing, enclosing the anode, anode charge colleting element, cathode, cathode charge collecting element and electrolyte,
    wherein the anode comprises lithium metal doped with a dopant, and the dopant is present in an amount of 0.02 to 1.0 atomic percent.
9. The battery of claim 8, further comprising a separator.
10. The battery of claim 8, wherein the electrolyte is liquid.
11. The battery of claim 8, wherein the anode has a thickness of at most 30 µm.
12. The battery of claim 8, wherein the cathode comprises a material selected from the group consisting of: sulfur compounds, cobalt compounds, graphite, nickel compounds, manganese compounds, oxides, iron compounds and mixtures thereof.
13. The battery of claim 8, wherein the electrolyte comprises
    a salt, selected from the group consisting of: $LiPF_6$, lithium bis(trifluoromethane)sulfonimide and mixtures thereof, and
    a solvent, selected from the group consisting of carbonates, ethers and mixtures thereof.
14. The battery of claim 8, wherein the anode has a thickness of at most 15 µm.
15. The battery of claim 13, wherein the salt comprises $LiPF_6$,
    the solvent comprises EC/DMC, and
    the cathode comprises NMC811.
16. A method of making the anode of claim 1, comprising:
    melting lithium metal,
    introducing a dopant metal into the lithium metal to form molten doped lithium metal,
    solidifying the doped lithium metal, and
    forming the doped lithium metal into a foil having a thickness of at most 50 µm.
17. A method of generating electrical power with the battery of claim 8, comprising:
    connecting the anode and cathode of the battery to an external load to complete a circuit.
18. The battery of claim 8, wherein the battery retains at least 70% capacity after 200 cycles.
19. The method of claim 16, wherein the battery is assembled in air.
20. A method of recharging the battery of claim 8, comprising connecting the battery to an electrical power source.

* * * * *